US012577134B2

(12) United States Patent
Russell et al.

(10) Patent No.: US 12,577,134 B2
(45) Date of Patent: Mar. 17, 2026

(54) HIGH-FLOW, INTACT BIOMATERIAL-DERIVED ELECTRODE FOR USE IN CAPACITIVE DESALINATION

(71) Applicant: Carnegie Mellon University, Pittsburgh, PA (US)

(72) Inventors: Alan J. Russell, Wexford, PA (US); Philip R. LeDuc, Wexford, PA (US); Adam Wood, Oakmont, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1006 days.

(21) Appl. No.: 17/425,519

(22) PCT Filed: Jan. 27, 2020

(86) PCT No.: PCT/US2020/015178
§ 371 (c)(1),
(2) Date: Jul. 23, 2021

(87) PCT Pub. No.: WO2020/154720
PCT Pub. Date: Jul. 30, 2020

(65) Prior Publication Data
US 2022/0081329 A1 Mar. 17, 2022

Related U.S. Application Data

(60) Provisional application No. 62/961,739, filed on Jan. 16, 2020, provisional application No. 62/918,332, filed on Jan. 25, 2019.

(51) Int. Cl.
*C02F 1/461* (2023.01)
*C02F 1/46* (2023.01)
(Continued)

(52) U.S. Cl.
CPC ........ *C02F 1/46109* (2013.01); *C02F 1/4604* (2013.01); *C02F 1/4691* (2013.01);
(Continued)

(58) Field of Classification Search
CPC .. C02F 1/46109; C02F 1/4604; C02F 1/4691; C02F 2001/46133; C02F 2001/46161;
(Continued)

(56) References Cited

U.S. PATENT DOCUMENTS

| | | | |
|---|---|---|---|
| 5,954,937 | A | 9/1999 | Farmer |
| 6,795,298 | B2 | 9/2004 | Shiue et al. |

(Continued)

FOREIGN PATENT DOCUMENTS

| | | | |
|---|---|---|---|
| CN | 105948187 A | | 9/2016 |
| CN | 107887174 A | * | 4/2018 |

(Continued)

OTHER PUBLICATIONS

Cuijie Feng, Yi-An Chen, Chang-Ping Yu, Chia-Hung Hou, Highly porous activated carbon with multi-channeled structure derived from loofa sponge as a capacitive electrode material for the deionization of brackish water, Chemosphere, vol. 208, Oct. 2018, pp. 285-293 (Year: 2018).*

(Continued)

*Primary Examiner* — Luan V Van
*Assistant Examiner* — Mofoluwaso S Jebutu
(74) *Attorney, Agent, or Firm* — The Webb Law Firm

(57) ABSTRACT

Provided herein are highly porous electrode structures made from natural materials and retaining natural architecture, which are highly permeable and find use in capacitive deionization desalination systems and methods. The porous electrode includes an electrode body including an architecturally intact carbonized organic material having a hydraulic permeability of at least $0.5 \times 10^{-13}$ m$^2$ as determined by (Continued)

application of Darcy's Law, and optionally having hierarchical porosity and a non-metal conductor attached to the electrode body. Also provided herein are methods of making the porous electrodes, desalination systems including the porous electrodes, and methods of desalinating water using the desalination systems including the porous electrodes.

19 Claims, 20 Drawing Sheets

(51) Int. Cl.
    *C02F 1/469*         (2023.01)
    *C02F 103/08*      (2006.01)

(52) U.S. Cl.
    CPC .............. *C02F 2001/46133* (2013.01); *C02F 2001/46161* (2013.01); *C02F 2103/08* (2013.01)

(58) Field of Classification Search
    CPC .. C02F 2001/46152; C02F 2001/46157; C02F 2001/46166; C02F 2001/46171; C25B 11/02; C25B 11/03; C25B 11/031; C25B 11/032; C25B 11/043; H01G 11/24; H01G 11/34; H01G 11/44
    See application file for complete search history.

(56) References Cited

U.S. PATENT DOCUMENTS

| | | | | |
|---|---|---|---|---|
| 8,372,510 | B2 | 2/2013 | Miller et al. | |
| 9,399,903 | B2 | 7/2016 | Janssen et al. | |
| 9,637,397 | B2 | 5/2017 | Averbeck et al. | |
| 2016/0240326 | A1* | 8/2016 | Fischel | H01G 11/70 |
| 2018/0233297 | A1* | 8/2018 | Zhamu | H01G 11/74 |

FOREIGN PATENT DOCUMENTS

| | | | | | |
|---|---|---|---|---|---|
| CN | 109225224 | A | * | 1/2019 | ........... B01J 23/002 |
| WO | WO-2018057416 | A1 | * | 3/2018 | ........... B23K 1/0016 |

OTHER PUBLICATIONS

Eric N. Guyes, Anastasia Simanovski and Matthew E. Suss, Several orders of magnitude increase in the hydraulic permeability of flow-through capacitive deionization electrodes via laser perforations, RSC Adv., 2017,7, 21308-21313 (Year: 2017).*
Lijuan Zhang et al., Bread-derived 3D macroporous carbon foams as high performance free-standing anode in microbial fuel cells, Biosensors and Bioelectronics, vol. 122, 2018, pp. 217-223 (Year: 2018).*
Graphene-bacteria composite for oxygen reduction and lithium ion batteries, Xuewan Wang, Wei Ai, Nan Li, Ting Yu and Peng Chen, J. Mater. Chem. A, 2015,3, 12873-12879 (Year: 2015).*
Lance S. Evans, Yuuya Okawa, Dennis G. Searcy, Anatomy and morphology of red mangrove (Rhizophora mangle) plants in relation to internal airflow, The Journal of the Torrey Botanical Society, 132(4):537-550 (2005). (Year: 2005).*
Junhua Jiang, Free-Standing Mesoporous Biocarbon Papers Based High-Rate Supercapacitor, Current Nanomaterials, vol. 3, Issue 3, Dec. 2018, p. 178-189 (Year: 2018).*
Mina Mahdian, Linda Y. Huang, Donald W. Kirk, Charles Q. Jia, Water permeability of monolithic wood biocarbon, Microporous and Mesoporous Materials, vol. 303, Aug. 15, 2020, 110258 (Year: 2020).*
Purnobasuki, H., Suzuki, M. Aerenchyma formation and porosity in root of a mangrove plant, Sonneratia alba (Lythraceae). J Plant Res 117, 465-472 (2004). (Year: 2004).*
Deng et al., "Inspired by Bread Leavening: One-pot Synthesis of Hierarchically Porous Carbon for Supercapacitors", RSC Green Chemistry, 2013, pp. 1-8, vol. 00.
Dinamani et al., "Electrosynthesis of Mg(OH)2 Coatings on Stainless Steel Substrates", Journal of Applied Electrochemistry, 2004, pp. 899-902, vol. 34.
Feng et al., "Highly Porous Activated Carbon with Multi-Channeled Structure Derived from Loofa Sponge as a Capacitive Electrode Material for the Deionization of Brackish Water", Chemosphere, 2018, pp. 1-28.
Hashaikeh et al., "Electrolytic Processing of MgO Coatings", Journal of Physics: Conference Series, 2009, pp. 1-4, Series 165.
Kawamoto, "Lignin Pyrolysis Reactions", Journal of Wood Science, 2017, pp. 117-132, vol. 63.
Laxman et al., "Desalination and Disinfection of Inland Brackish Ground Water in a Capacitive Deionization Cell using Nanoporous Activated Carbon Cloth Electrodes", Desalination, 2015, pp. 126-132, vol. 362.
Lei et al., "Nanostructured Polyaniline/Kenaf-Derived 3D Porous Carbon materials with High Cycle Stability for Supercapacitor Electrodes", Journal Materials Science, 2017, pp. 2158-2168, vol. 52.
Li et al., "Carbonized Leaf Membrane with Anisotropic Surfaces for Sodium Ion Battery", ACS Applied Materials & Interfaces, 2016, pp. 1-22.
Liu et al., "Efficient Capacitive Deionization Using Natural Brasswood Derived, Free Standing, Hierarchically Porous Carbon Electrodes", ACS Applied Materials & Interfaces, 2018, 86 pages.
Oh et al., "Biotemplating Pores with Size and Shape Diversity for Li-Oxygen Battery Cathodes", Scientific Reports, 2017, pp. 1-11.
Wang et al., "Quaternary Ammonium Compound Functionalized Activated Carbon Electrode for Capacitive Deionization Disinfection", ACS Sustainable Chemistry & Engineering, 2018, pp. 17204-17210, vol. 6.
Wang et al., "High-Performance Capacitive Deionization Disinfection of Water with Graphene Oxide-graft-Quaternized Chitosan Nanohybrid Electrode Coating", ACS Nano, 2015, pp. 10142-10157, vol. 9, No. 10.
Wood et al., "Intact Mangrove Root Electrodes for Desalination", RSC Advances, 2019, pp. 4735-4743, vol. 9.
Zhang et al., "Bread-Derived 3D Macroporous Carbon Foams as High Performance Free-Standing Anode in Microbial Fuel Cells", Biosensors & Bioelectronics, 2018, pp. 217-223, vol. 122.
Zou et al., "Highly Textural Lamellar Mesostructured Magnesium Hydroxide via a Cathodic Electrodeposition Process", Science Direct, 2007, pp. 1990-1993, vol. 61.

* cited by examiner

Table 1 – Comparison of necessary fabrication materials and electrosorption capacities for various FT-CDI electrodes.

| Electrode | Fabrication materials | Applied voltage (V) | Electrosorption capacity (mg g$^{-1}$) |
|---|---|---|---|
| Electrospun porous hierarchical carbon nanofibers | Polyvinylpyrrolidone<br>Polyacrylonitrile<br>Dimethylformamide<br>Carbon dioxide | 1.2 | 7.61 |
| N-doped porous carbon | Zinc nitrate hexahydrate<br>Cobalt nitrate hexahydrate<br>Methanol<br>2-methylimidazole<br>Hydrofluoric acid<br>Acetylene black<br>Polytetrafluoroethylene<br>Graphite paper | 1.4 | 16.63 |
| 3D graphitic carbon/SiC | Silicon carbide foam<br>Methane<br>Activated carbon | 1.5 | 3.2 |
| 3D foam-like carbon nanoarchitectures | Colloidal silica<br>3-(Trimethoxysilyl)propylmethacrylate<br>Epoxy acrylate resin<br>1,4-butanediol diglycidyl ether<br>Sodium hydroxide<br>Polytetrauoroethylene<br>Ethanol<br>Graphite substrate | 1.4 | 20.9 |
| 3D graphene with hierarchical porous structure | Polystyrene nanospheres<br>Ammonium molybdate<br>Graphite oxide<br>Hydrochloric acid<br>Polytetrafluoroethylene<br>Carbon black<br>Graphite sheet | 1.2 | 14.7 |
| Hierarchical carbon aerogel monolith | Resorcinol<br>Formaldehyde<br>Acetic acid<br>Carbon dioxide | 1.5 | 10.2 |
| Laser-perforated activated carbon | Activated carbon electrodes (PAC MM 203) | 1.0 | 3 |
| Intact mangrove root (this work) | R. mangle root<br>Epoxy resin | 1.5 | 9.6 |

Fig. 5

Table 2 – Comparison of electrosorption capacity for various biomass-based CDI electrodes and necessary treatment/materials for electrode fabrication.

| Biomass | Activation/ Treatment | Binder/ Additives | Current collector | Applied voltage (V) | Electro-sorption capacity (mg g$^{-1}$) |
|---|---|---|---|---|---|
| Citrus Peel | $ZnCl_2$ | PTFE | Titanium mesh | 1.5 | 10.79, 16.2* |
| | KOH | PTFE | Titanium mesh | 1.5 | 8.58 |
| | $H_3PO_4$ | PTFE | Titanium mesh | 1.5 | 5.22 |
| | - | PTFE | Titanium mesh | 1.5 | 8.44 |
| Bacterial-cellulose | $NH_3$ | - | - | 1.2 | 17.29 |
| Bacterial-cellulose | $H_3PO_4$ | - | - | 1.2 | 16.20 |
| Bacterial-cellulose | - | - | - | 1.2 | 12.81 |
| Palm shell | $ZnCl_2, CO_2$ | PVDF, DMAc | - | 1.2 | 3.3 |
| Wheat straw | KOH, $SiO_2$ sol | PTFE | Graphite sheet | N/A | 2.67 |
| Silk cocoon | - | Acetylene black, PVA | Graphite substrate | 1.2 | 12.02 |
| | $CO_2$ | Acetylene black, PVA | Graphite substrate | 1.2 | 16.56 |
| L. leucocephala wood | KOH, $CO_2$ | PVDF | - | 1.0 | 2.1 |
| Coconut shell | KOH, $CO_2$ | PVDF | - | 1.0 | 20.91 |
| Woody biomass | KOH | Nafion | Carbon cloth | N/A | 5.39 |
| Basswood | $CO_2$ | - | - | 1.2 | 5.7 |
| Mangrove root (this work) | - | - | - | 1.5 | 9.6 |

*Electrode only used as anode in CDI system.

Fig. 6 a
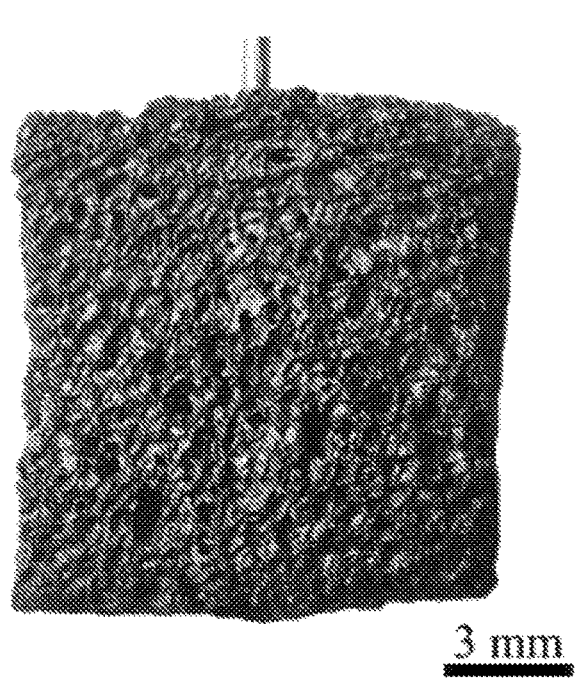
3 mm
b                                    c
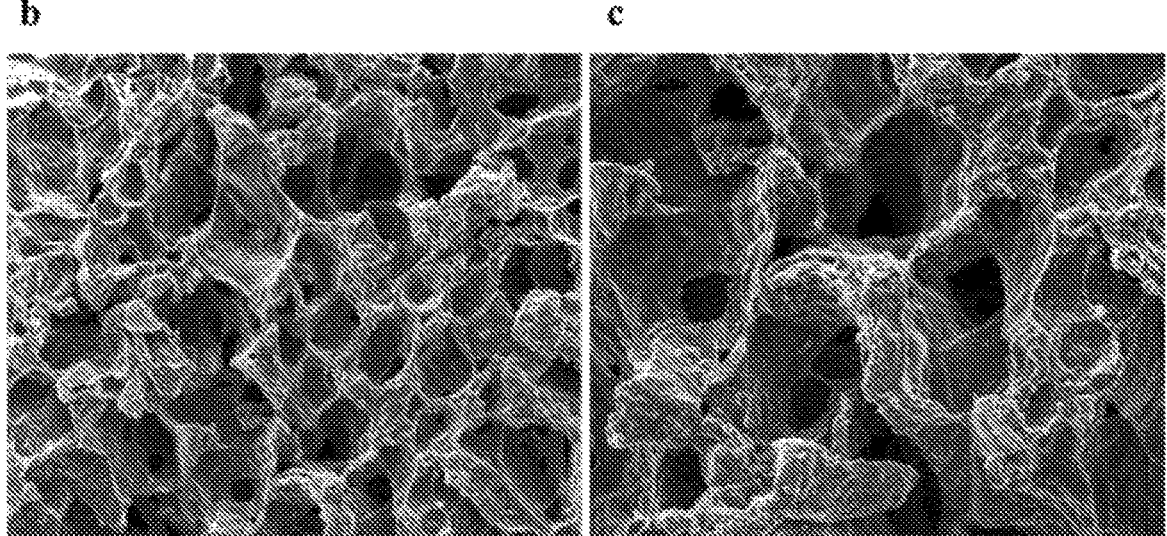
Fig. 7 a
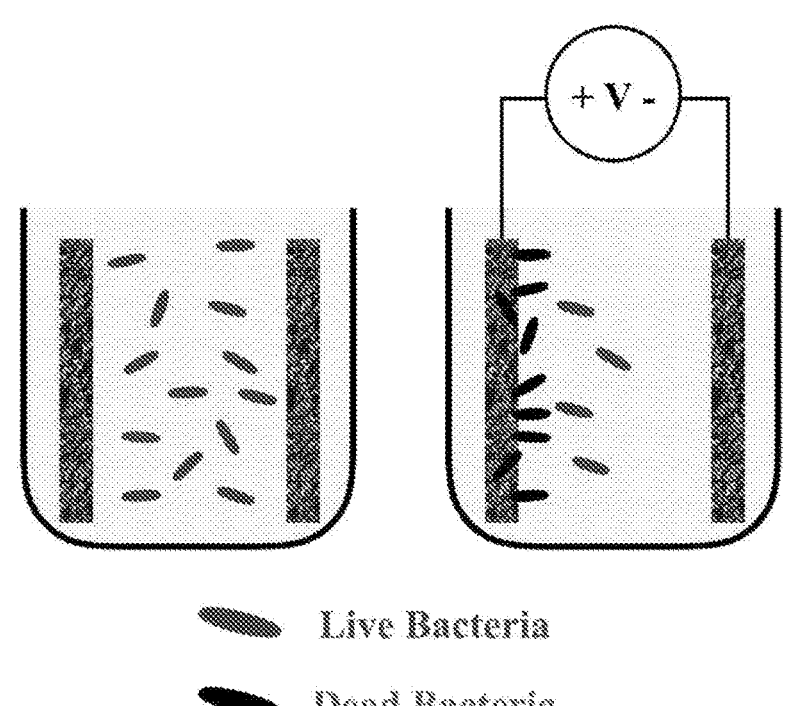
b
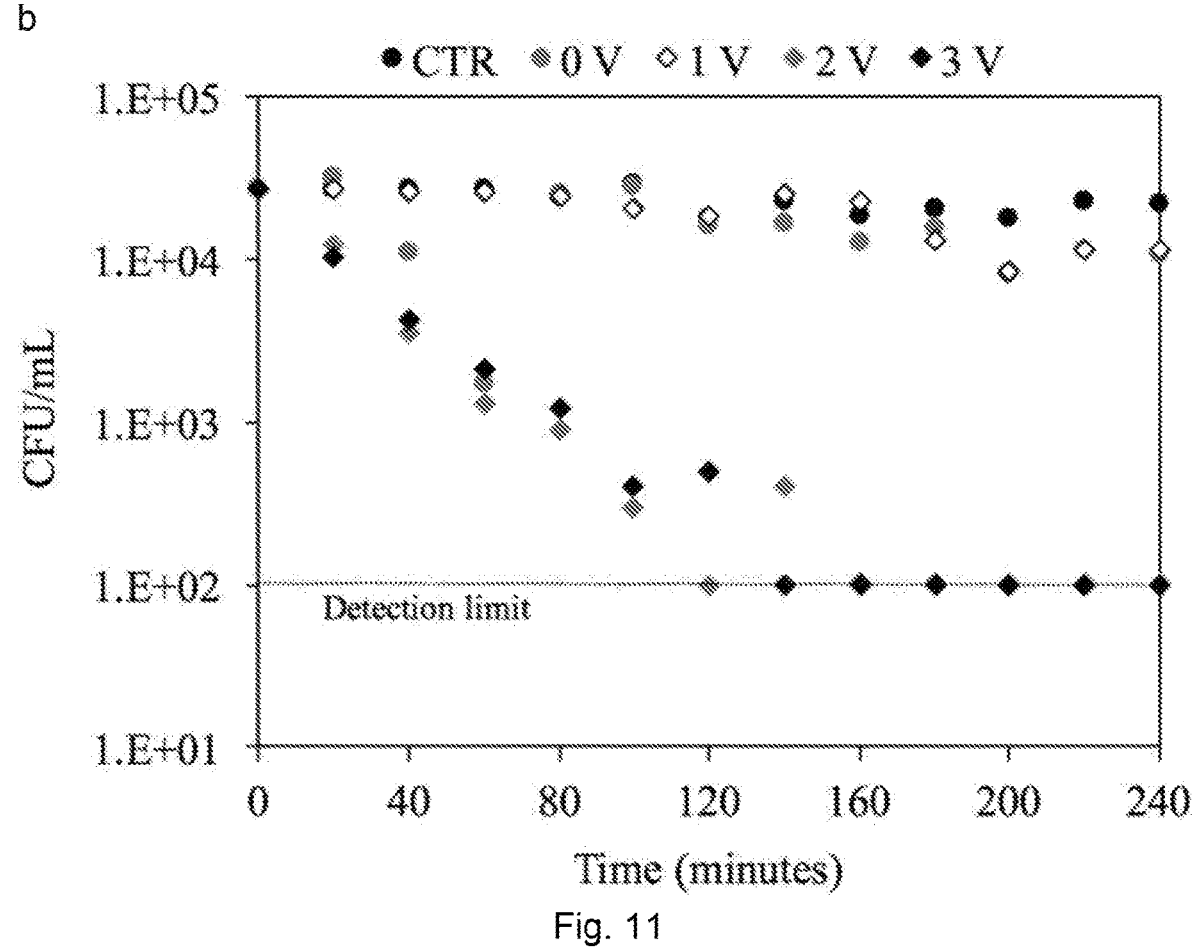
Fig. 11 a    b c    d a
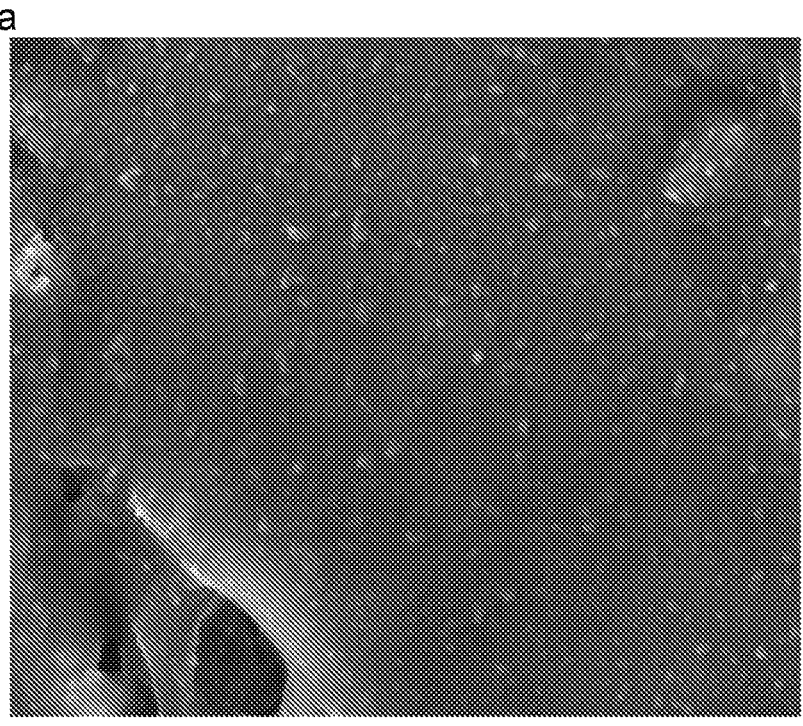
b
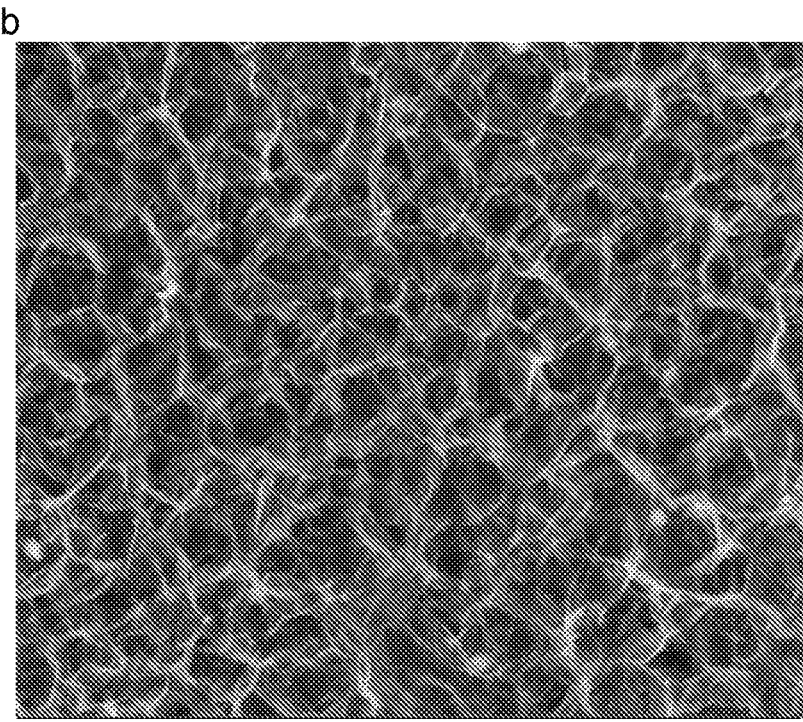
Fig. 18 a
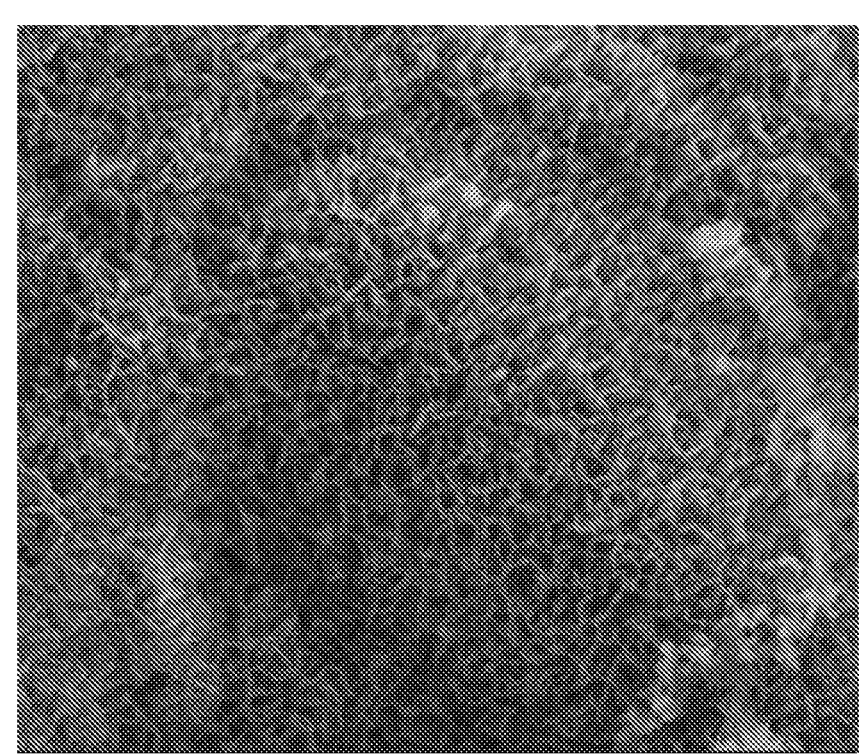
b
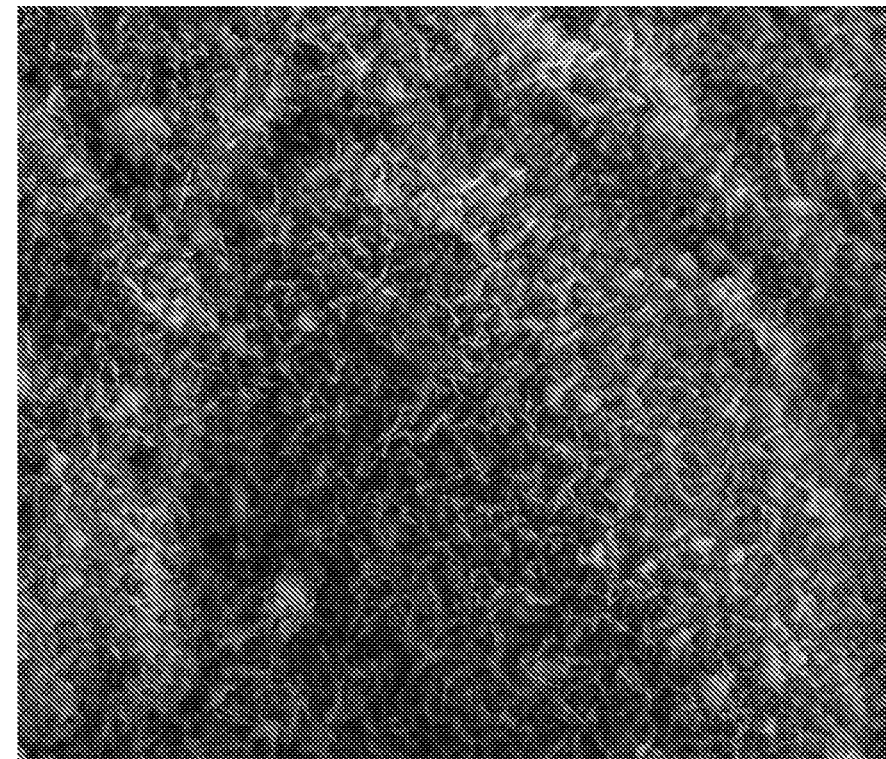
Fig. 19 a b

HIGH-FLOW, INTACT BIOMATERIAL-DERIVED ELECTRODE FOR USE IN CAPACITIVE DESALINATION

CROSS REFERENCE TO RELATED APPLICATIONS

This application is the United States national phase of International Application No. PCT/US2020/015178 filed Jan. 27, 2020, and claims the benefit of U.S. provisional patent application Nos. 62/918,332, filed Jan. 25, 2019, and 62/961,739, filed Jan. 16, 2020, each of which is incorporated herein by reference in its entirety.

Meeting the water demands of a growing global population is one of the world's "grand challenges". To increase freshwater supply, many areas of the world generate drinking water by desalination of brackish water and seawater. In resource-rich regions, technologies such as reverse osmosis and thermal distillation are feasible solutions for desalination. However, the development of more cost-effective and energy-efficient technologies remains an important area of research, especially for areas without easy technology access or financial resources, which has led to the emergence of capacitive deionization (CDI). CDI desalinates a salty feed solution by electrostatically adsorbing ionic species to a pair of oppositely charged electrodes. When considering that the only essential operating components for CDI are a pair of electrodes and a low-voltage power supply, water desalination in resource-starved environments can be envisioned as a potential practical solution. Furthermore, if coupled to solar energy, CDI is a particularly attractive means to address the need for water in remote locations and also for renewable uses as well.

CDI is a potential low-energy and cost-effective alternative to current desalination technologies for the removal of ionic species from low-salinity water sources. A major aspect of CDI research has focused on the fabrication of high surface area carbon-based electrodes. Carbon aerogels, carbon nanotubes, graphene-based materials, and activated carbons (ACs) are all exciting developments with the goal to combine high surface area with robust performance. ACs derived from biomass or waste products are an attractive and commonly used core component of CDI systems. However, common electrode fabrication techniques using ACs require additional materials such as binders and current collectors which can increase overall electrical resistance and material cost. Several recent studies have investigated the use of binder-free, freestanding electrodes to circumvent these issues. CDI electrodes to date are generated in high-technology environments and the manufacturing of a CDI system cannot be decentralized. We have therefore been searching for an ideal source material that could be combined with a reliable low-technology fabrication process to generate a CDI electrode in decentralized locations.

For static CDI systems, the electrodes can be configured such that the feed stream either flows by (FB) the electrodes or directly through (FT) the electrodes. In FB systems, the feed stream is directed through a separator layer between the electrodes that is typically 200-500 μm thick. FT systems offer an advantage of minimizing the separator layer thickness (i.e. down to ~10 μm) because it is not the primary channel for fluid transport. The reduction in separator layer thickness can enable higher desalination rates, greater reductions in feed concentration, and greater accessibility to the entire electrode surface for ion adsorption. Unfortunately, one of the major drawbacks of FT systems is that they typically require greater feed pressures to sustain a throughput comparable to FB systems. To address this issue, work has been directed towards the fabrication of hierarchical-structured electrodes possessing both large pores (0.1-200 μm diameter) to facilitate fluid transport and small pores (~1 nm) to enhance surface area and salt adsorption capacity (SAC). Although past studies have shown great success, further work to investigate an easy, low-cost method towards fabricating such specialized electrodes was needed.

SUMMARY

In one aspect of the invention, provided herein is a porous electrode comprising: an electrode body comprising an architecturally intact carbonized organic material having a hydraulic permeability of at least $0.5 \times 10^{-13}$ m$^2$ or at least $1.0 \times 10^{-13}$ m$^2$, such as at least $0.5 \times 10^{-11}$ m$^2$ or at least $1.0 \times 10^{-11}$ m$^2$, as determined by application of Darcy's Law, and optionally having hierarchical porosity; and a non-metal conductor attached to the electrode body.

In another aspect, provided herein is A method of making an electrode for use in a capacitive deionization desalination system, comprising: carbonizing an architecturally intact porous organic material to produce an architecturally intact carbonized structure having a hydraulic permeability of at least $0.5 \times 10^{-13}$ m$^2$ or at least $1.0 \times 10^{-13}$ m$^2$, such as at least $0.5 \times 10^{-11}$ m$^2$ or at least $1.0 \times 10^{-11}$ m$^2$, as determined by application of Darcy's Law; and attaching a conductor to the carbonized material to produce an electrode.

In another aspect, provided herein is a desalination system comprising: a fluid conduit having an inlet and an outlet; a first pair of porous comprising: an electrode body comprising an architecturally intact carbonized organic material having a hydraulic permeability of at least $0.5 \times 10^{-13}$ m$^2$ or at least $1.0 \times 10^{-13}$ m$^2$, such as at least $0.5 \times 10^{-11}$ m$^2$ or at least $1.0 \times 10^{-11}$ m$^2$, as determined by application of Darcy's Law. and optionally having hierarchical porosity; and a non-metal conductor attached to the electrode body, separated by a gap, and disposed within the conduit so that water flowing through the conduit passes through the electrodes; an electrically-conductive lead attached independently to each of the non-metal conductors; and a DC power supply having a positive terminal attached to one electrically-conductive lead, and a negative terminal attached to the other electrically-conductive lead.

In yet another aspect, provided herein is a method of purifying salt or brackish water, comprising: flowing water through the conduit of the desalination system comprising: a fluid conduit having an inlet and an outlet; a first pair of porous comprising: an electrode body comprising an architecturally intact carbonized organic material having a hydraulic permeability of at least $0.5 \times 10^{-13}$ m$^2$ or at least $1.0 \times 10^{-13}$ m$^2$, such as at least $0.5 \times 10^{-11}$ m$^2$ or at least $1.0 \times 10^{-11}$ m$^2$, as determined by application of Darcy's Law. and optionally having hierarchical porosity; and a non-metal conductor attached to the electrode body, separated by a gap, and disposed within the conduit so that water flowing through the conduit passes through the electrodes; an electrically-conductive lead attached independently to each of the non-metal conductors; and a DC power supply having a positive terminal attached to one electrically-conductive lead, and a negative terminal attached to the other electrically-conductive lead. While flowing water through the conduit, the method further comprises applying a voltage to the electrode pair of up to 1.23V effective to deionize the water; and collecting the deionized effluent from the outlet of the conduit.

The following numbered clauses describe exemplary aspects or embodiments of the invention.

Clause 1. A porous electrode comprising:

an electrode body comprising an architecturally intact carbonized organic material having a hydraulic permeability of at least $0.5\times10^{-13}$ m$^2$ or at least $1.0\times10^{-13}$ m$^2$, such as at least $0.5\times10^{-11}$ m$^2$ or at least $1.0\times10^{-11}$ m$^2$, as determined by application of Darcy's Law, and optionally having hierarchical porosity; and a non-metal conductor attached to the electrode body.

Clause 2. The electrode of clause 1, wherein the organic material is a porous plant portion or an architecturally intact expanded viscoelastic plant material.

Clause 3. The electrode of clause 2, wherein the electrode body is an architecturally intact, carbonized porous plant portion.

Clause 4. The electrode of clause 3, wherein the porous plant portion is aerenchyma.

Clause 5. The electrode of clause 2, wherein the electrode body is an architecturally intact, gas-expanded viscoelastic plant material.

Clause 6. The electrode of clause 5, wherein the gas-expanded viscoelastic plant material comprises gluten.

Clause 7. The electrode of clause 5 or 6, wherein the gas-expanded viscoelastic plant material is bread.

Clause 8. The electrode of any one of clauses 1-7, decorated with carbonized bacteria lysis residue.

Clause 9. A desalination system comprising:

a fluid conduit having an inlet and an outlet;

a first pair of porous electrodes according to any one of clauses 1-8, separated by a gap, and disposed within the conduit so that water flowing through the conduit passes through the electrodes;

an electrically-conductive lead attached independently to each of the non-metal conductors; and a DC power supply having a positive terminal attached to one electrically-conductive lead, and a negative terminal attached to the other electrically-conductive lead.

Clause 10. The desalination system of clause 9, further comprising a switch for controlling voltage from the power supply to the electrodes.

Clause 11. The desalination system of clause 10, further comprising a controller for controlling the switch, the controller comprising at least a processor and computer-readable instructions for the processor to control electrical current from the power supply to the electrodes.

Clause 12. The desalination system of any one of clauses 9-11, further comprising a sensor at the outlet of the fluid conduit for measuring salinity of effluent from the outlet.

Clause 13. The desalination system of clause 12, comprising a controller for controlling the switch, the controller comprising at least a processor and instructions for the processor to control electrical current from the power supply to the electrodes, the computer, and further comprising a waste outlet and a valve for directing water from the outlet to the waste outlet and further comprising instructions for the processor to turn off the power supply when salinity of the effluent approaches or equals that of water flowing into the inlet, the system, and for controlling the valve to direct waste water through the waste outlet.

Clause 14. The desalination system of any one of clauses 9-13, wherein the DC power supply comprises a solar cell or a solar panel.

Clause 15. The desalination system of any one of clauses 9-14, wherein the DC power supply comprises a battery.

Clause 16. The desalination system of any one of clauses 9-15, comprising two or more pairs of the porous electrode in one or more conduits and in series with and/or in parallel to the first porous electrode pair.

Clause 17. The desalination system of any one of clauses 9-16, further comprising a recirculation subsystem configured to return effluent from the outlet of the conduit to the inlet of the conduit.

Clause 18. A method of making an electrode for use in a capacitive deionization desalination system, comprising:

carbonizing an architecturally intact porous organic material to produce an architecturally intact carbonized structure having a hydraulic permeability of at least $0.5\times10^{-13}$ m$^2$ or at least $1.0\times10^{-13}$ m$^2$, such as at least $0.5\times10^{-11}$ m$^2$ or at least $1.0\times10^{-11}$ m$^2$, as determined by application of Darcy's Law; and attaching a conductor to the carbonized material to produce an electrode.

Clause 19. The method of clause 18, wherein the intact organic material is carbonized at a carbonization temperature of at least 550° C.

Clause 20. The method of any one of clauses 18-20 wherein the temperature is raised from ambient temperature, such as from 25° C. to 40° C., or from 100° C. to the carbonization temperature over a time period of at least 30 minutes or of at least 60 minutes and/or with a temperature ramp rate of no more than 5° C., 10° C., or 20° C. per minute.

Clause 21. The method of any one of clauses 18-20, wherein the porous organic material is a porous plant portion or carbonized, architecturally intact expanded viscoelastic plant material.

Clause 22. The method clause 21, wherein the porous organic material is an architecturally intact, porous plant portion.

Clause 23. The method of clause 22, wherein the porous plant portion is aerenchyma.

Clause 24. The method of clause 21, wherein the porous organic material is an architecturally intact, gas-expanded viscoelastic plant material.

Clause 25. The method of clause 24, wherein the gas-expanded viscoelastic plant material comprises gluten.

Clause 26. The method of clause 24 or 25, wherein the gas-expanded viscoelastic plant material is bread.

Clause 27. The method of any one of clauses 18-26, further comprising etching the carbonized structure to produce a hierarchical porosity.

Clause 28. The method of any one of clauses 18-27, further comprising decorating the architecturally intact carbonized structure of the electrode with carbonized bacteria lysis residue by placing the electrode with a counter-electrode in a solution comprising bacteria, such as *E. coli* bacteria, in water, applying a voltage in the range of from 1V to 6V, with the electrode having a negative charge, to lyse the bacteria and draw cell debris to the electrode, and carbonizing the electrode with the cell debris, thereby decorating the electrode with carbonized cell debris.

Clause 29. A method of purifying salt or brackish water, comprising:

flowing water through the conduit of the desalination system of any one of clauses 9-17;

applying a voltage to the electrode pair effective to deionize the water; and collecting the deionized effluent from the outlet of the conduit.

Clause 30. The method of clause 29, further comprising passing the effluent from the outlet of the conduit though the conduit and collecting the effluent one or more additional times.

Clause 31. The method of clause 29 or 30, wherein the collected effluent is potable water.

Clause 32. The method of any one of clauses 29-31, further comprising after collecting deionized water from the outlet of the conduit, discontinuing application of the voltage to the electrodes; washing the electrodes with water; and collecting brine from the outlet of the conduit.

Clause 33. The method of any one of clauses 29-32 comprising passing the collected deionized effluent from the outlet of the conduit through the conduit while applying a voltage effective to disinfect the water, such as a voltage of at least 1V, and collecting the disinfected, deionized water from the outlet of the conduit.

Clause 34. The method of any one of clauses 29-33, wherein the electrode bodies of the electrodes are carbonized bread.

BRIEF DESCRIPTION OF THE DRAWINGS

FIG. 5 provides Table 1-Comparison of necessary fabrication materials and electrosorption capacities for various FT-CDI electrodes.

FIG. 6 provides Table 2-Comparison of electrosorption capacity for various biomass-based CDI electrodes and necessary treatment/materials for electrode fabrication.

FIG. 7. Images of freestanding bread-derived electrodes. (a) Digital image of a carbonized bread electrode. (b,c) Scanning electron microscope (SEM) images of carbonized freestanding bread electrodes showing their highly porous structure.

FIG. 11. (a) Schematic of bacterial disinfection from contaminated water using bread-derived electrodes coupled to a voltage source. (b) Representative experiment showing bacteria cell concentration over time as a function of applied voltage.

7 magnifications. (d-f) Representative SEM images of negative electrode surface after disinfection experiments at varying magnifications. 200× (a,d), 1,600× (b,e), 6,000× (c, f).

Figure 15:
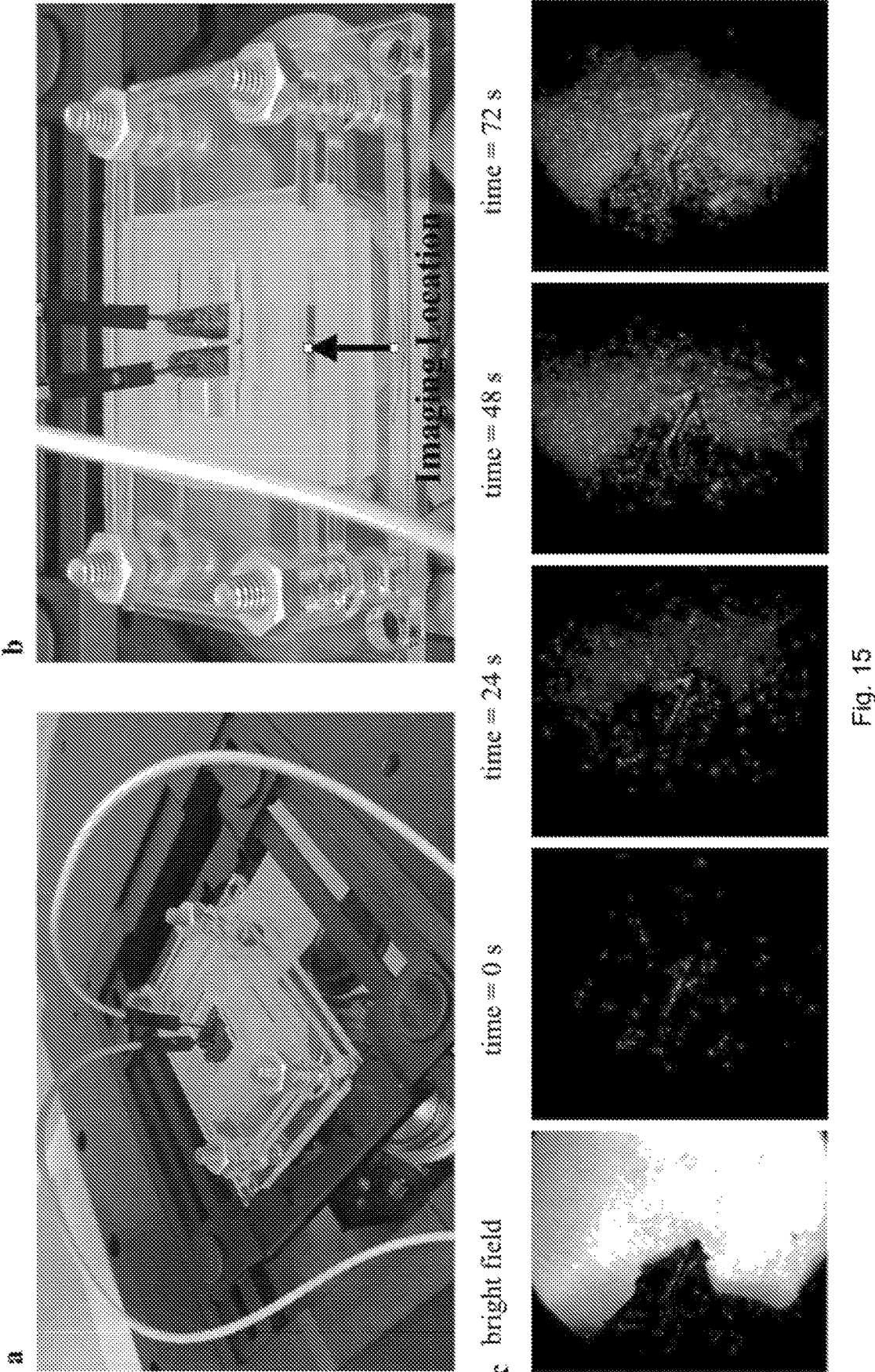

FIG. 15. (a,b) Custom-designed platform fitted to confocal microscope stage for real time imaging of bacteria in bread-based CDI system. (c) Accumulation of GFP-expressing *E. coli* on positive electrode surface over time when a voltage potential is applied to electrode pair.

Figure 16:
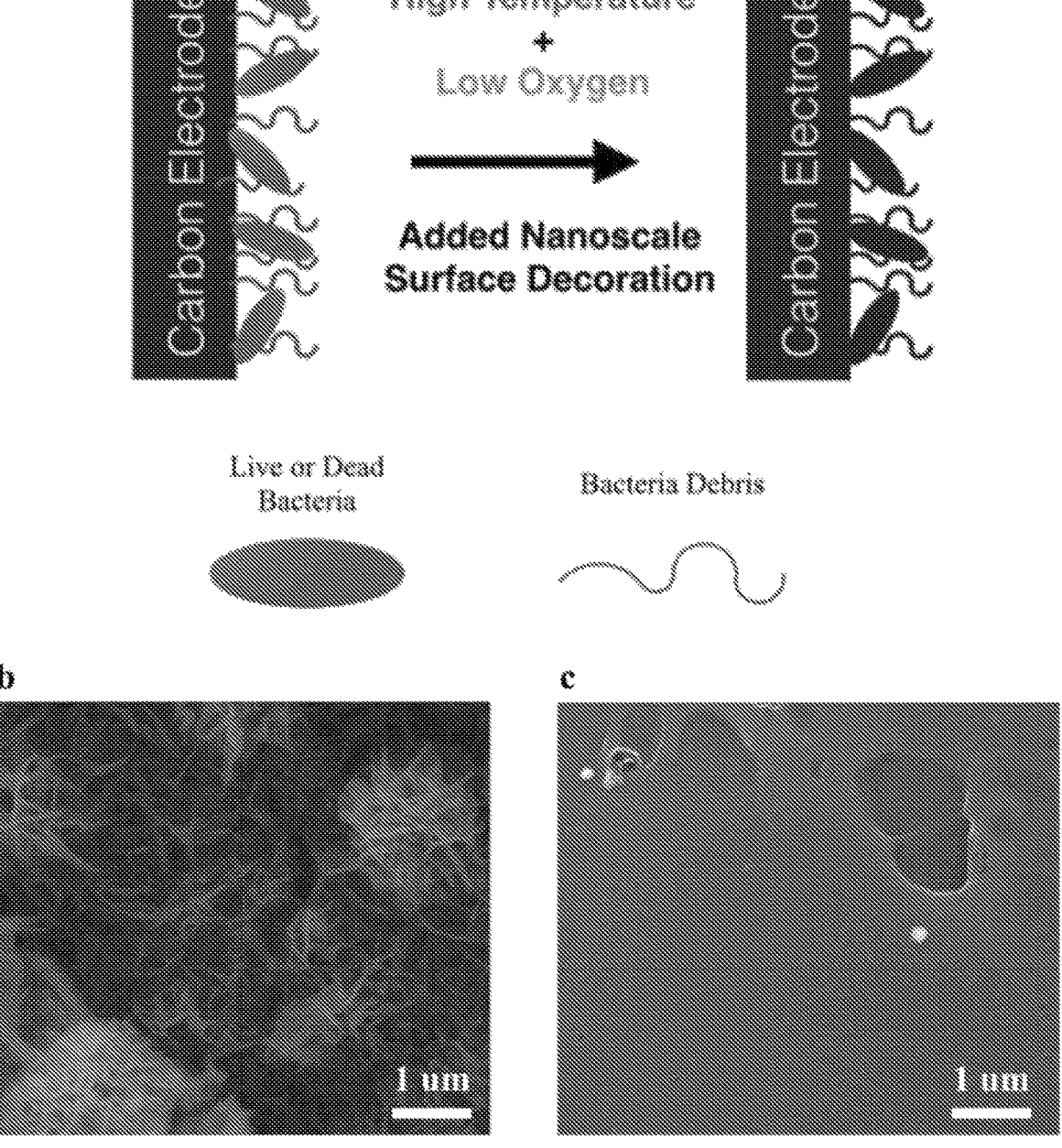

FIG. 16. (a) Schematic of bacteria-enabled surface decoration to produce carbonized surface decoration. (b). Representative image of surface decoration on negative electrode after bacteria disinfection experiment. (c) Representative of bread-derived electrode surface.

Figure 17:
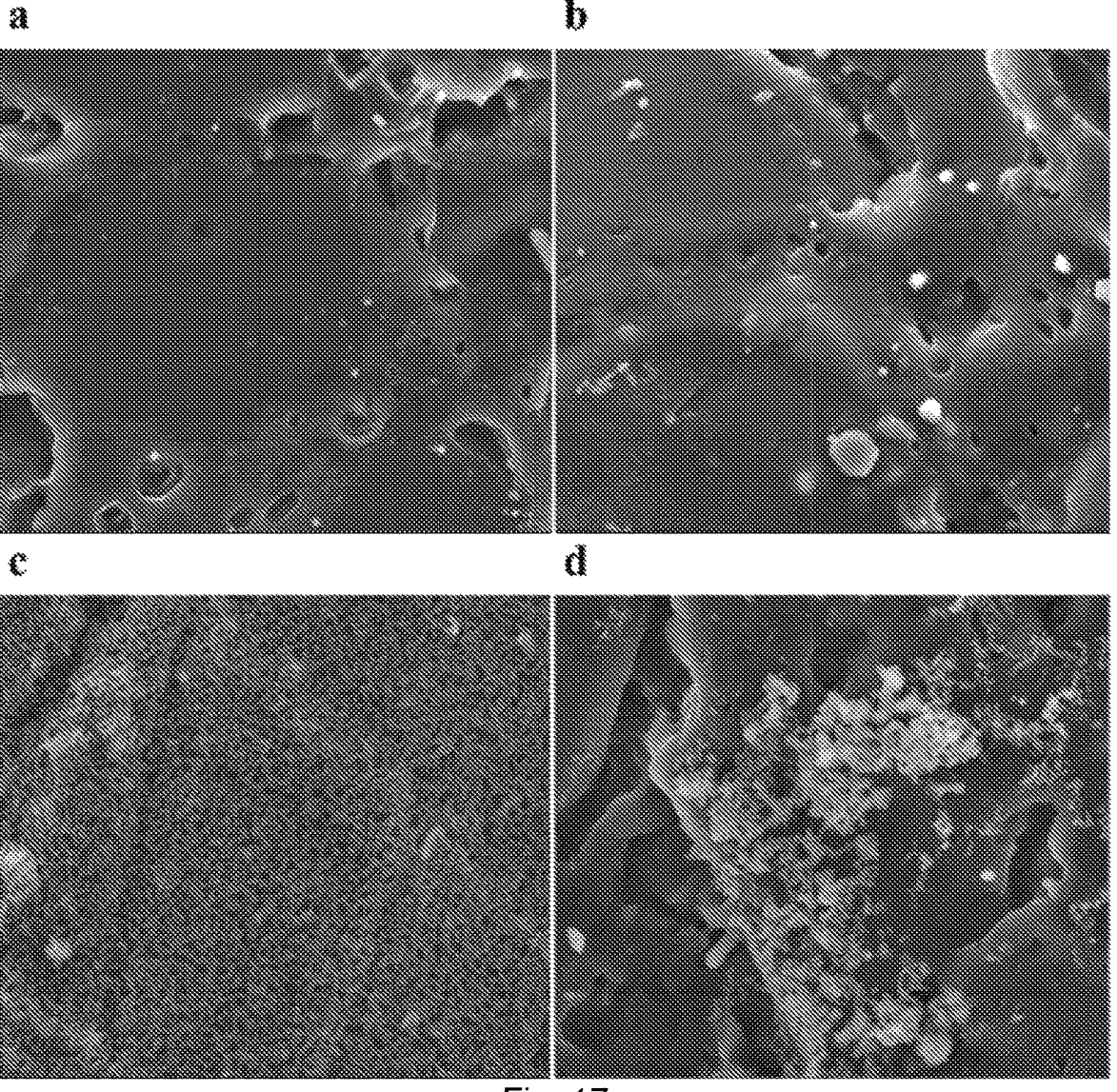

FIG. 17. (a) SEM image of electrode surface at 3 hour time point (voltage=0 V). (b) SEM image of negative electrode surface at 0.25 hour time point (voltage=3 V). (c) SEM image of negative electrode surface at 1 hour time point (voltage=3 V). (d) SEM image of negative electrode surface at 3 hour time point (voltage=3 V).

FIG. 18. (a) Representative SEM image of negative electrode surface after 1 hour bacteria disinfection experiment at 3 V in LB broth. (b) Representative SEM image of negative electrode surface after 1 hour bacteria disinfection experiment at 3 V in filtered deionized water.

FIG. 19. (a) Representative SEM image of negative electrode surface showing surface decoration before re-carbonization. (b) Representative SEM image of negative electrode surface showing retained surface decoration after re-carbonization.

Figure 20:
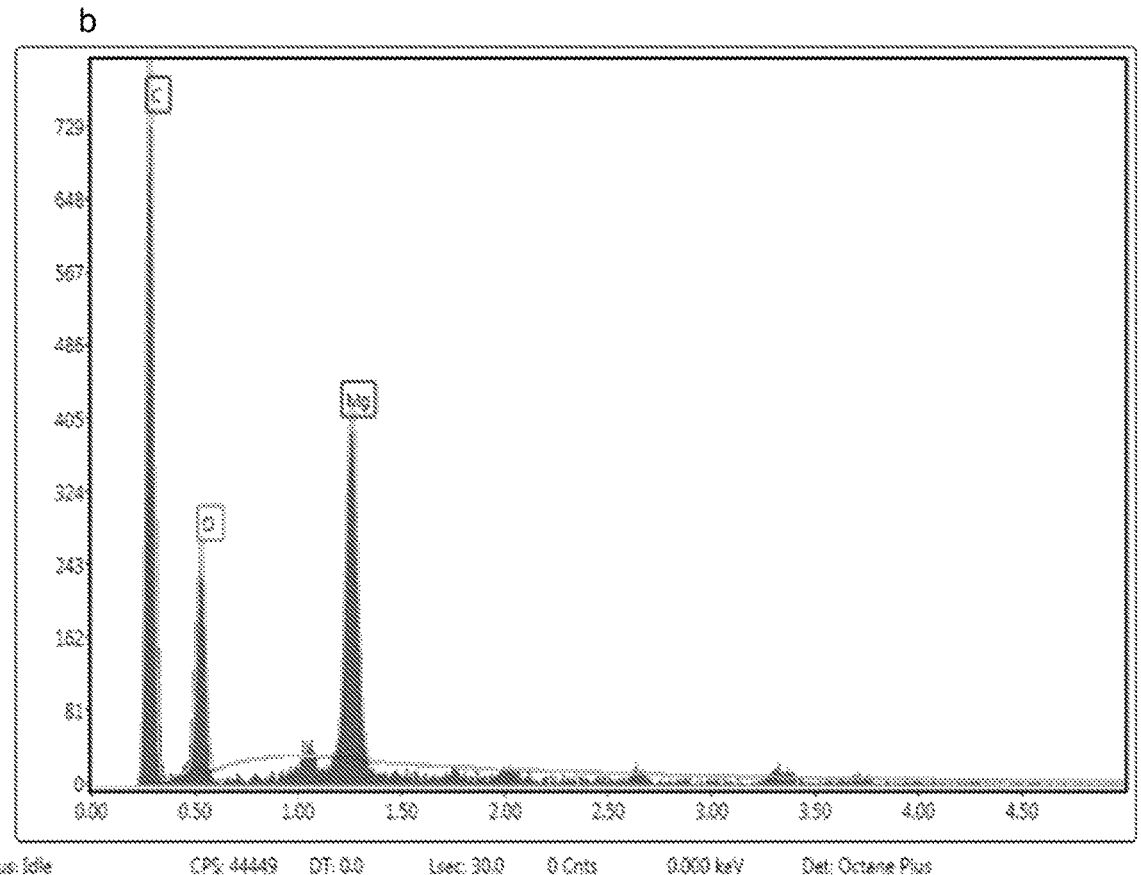

FIG. 20. (a) SEM image showing region of interest for EDS analysis of surface decoration after re-carbonization. (b) EDS spectra of electrode surface showing traces of C, O, and Mg.

Figure 21:
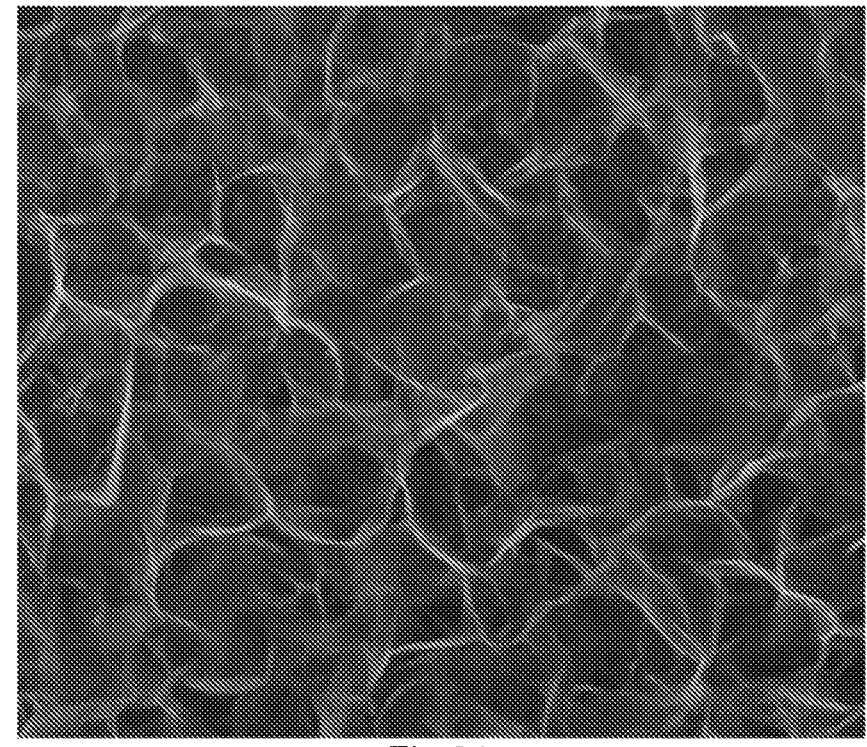

FIG. 21. SEM image showing surface decoration produced on negative electrode surface from bacterial disinfection mimic experiment using $MgCl_2$.

DETAILED DESCRIPTION

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. The drawings are not necessarily to scale. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

Figure 1:
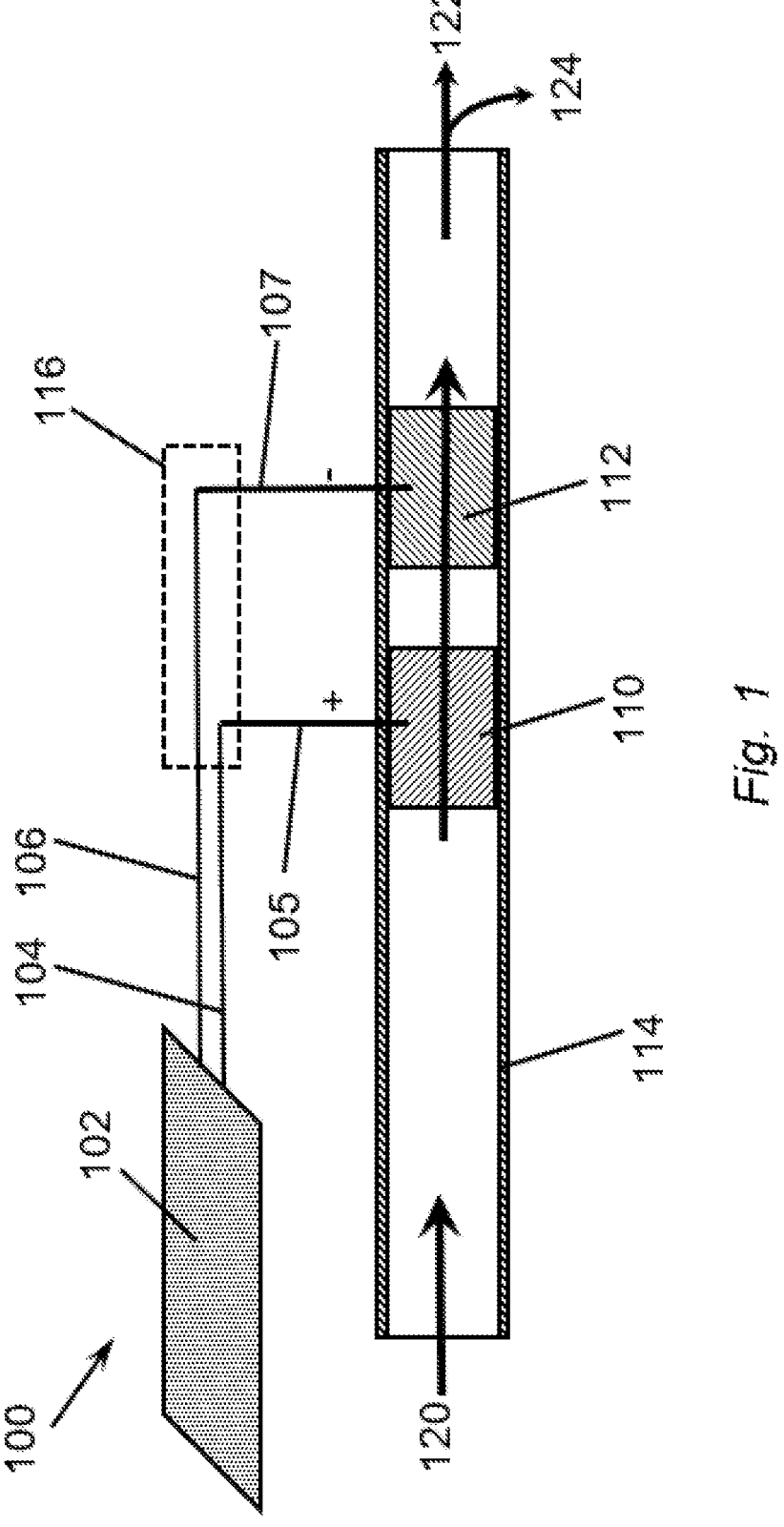
FIG. 1 depicts schematically a desalination system as described herein.

Aerenchyma is a specialized tissue predominantly found in wetland plants. Aerenchyma is a spongy tissue that includes spaces or air channels in the leaves, stems and roots of some plants. It allows exchange of gases between the plant and the root. The channels of air-filled cavities provide a low-resistance internal pathway for the exchange of gases such as oxygen and ethylene between the plant above the water and the submerged tissues. Aerenchyma is widespread in aquatic and wetland plants which must grow in hypoxic soils, but is found in many species, such as in mangrove, rice, maize, lotus, *Myriophyllum* species, and waterlilies, including red mangrove (*Rhizophora mangle*) plants. Aerenchyma tissue is often woody to some extent, which refers to the presence of lignin in the cell walls of plant tissue, and develops by lignification of the plant tissue. Lignification adds rigidity and rot resistance to the tissue. Aerenchyma in mangrove and rice are typically woody. FIG. 1 depicts an exemplary capacitive deionization desalination system 100. The system is powered by a solar panel 102 as a power source, which is connected to a first lead 104 terminating in a non-metal first rod 105, and a second lead 106, terminating in a non-metallic second rod 107. A solar panel is an exemplary power source, and any suitable power source may be used to power the capacitive deionization desalination system 100 as described in FIG. 1 and elsewhere herein. The first rod 105 and the second rod 107 are electrically-conductive structures that do not significantly corrode or dissolve in salt or brackish water and which may comprise an electrically-conductive carbon material, such as carbon black, or a carbon allotrope, such as graphite, or that may comprise any electrically-conductive, non-metal, such as a conductive ceramic.

The first rod 105 is in electrical contact with, e.g., embedded in, first porous electrode 110, and the second rod 107 is in electrical contact with second porous electrode 112, which is spaced-apart from the first porous electrode 110. First and second porous electrodes 110, 112, are arranged in series in fluid conduit 114. Water flows through fluid conduit 114 and through first and second porous electrodes 110, 112 in the direction depicted by the arrows. It should be noted that the first and second porous electrodes 110, 112 may be arranged in the opposite order as shown in FIG. 1 (or the waterflows in the opposite direction), in that waterflows first through the second porous electrode 112, and second through the first porous electrode 110. A controller 116 may be included in-line between the power source, such as the solar panel 102, and the electrodes 110, 112. The controller may be any suitable switch or computer-controlled processor or interface for controlling the current to the electrodes.

In use, salt or brackish water passes into the conduit 114 at inlet 120, though the electrodes 110, 112 and exits the conduit at outlets 122 and 124. Any suitable fluid connectors and flow control devices, such as valves (collectively, plumbing) may be attached to inlet 120 and outlets 122, 124. When in use, salt or brackish water is fed or passes into the inlet 120, and a voltage is applied to the electrodes 110, 112, and the water is deionized. Brackish (having a salinity less than salt water) or fresh water passes through outlet 122. The current at the electrodes 110, 112 is controlled by controller 116, either automatically, e.g. by a computer-implemented process, or by manual control of a switch. Because the electrodes 110, 112 will become saturated, they may be restored by turning off the current, allowing retained ions to be washed out in effluent, which is directed to waste outlet 124. The controller 116 may direct switching off the current to restore the electrodes 110, 112. The controller may control a valve (not shown) configured to alternately direct the effluent though outlet 122 and waste outlet 124. Salinity of the effluent of the system 100 passing through the outlet 122 may be determined by any effective method, such as by measuring conductivity, and the controller 116 may initiate electrode restoration by turning off power to the electrodes 110, 112, and shunting waste effluent through waste outlet 124, and after a designated time period, or after salinity of the waste effluent is satisfactorily reduced, indicative of restoration of the electrodes 110, 112, restore power to the electrodes 110, 112, and directing effluent to outlet 122. A structure also may be included to direct water from outlet 122 back to inlet 120 to repeat desalination one or more times until a desired salinity is reached.

As would be recognized by those of ordinary skill, FIG. 1 depicts only one pair of electrodes 110, 112. In practice, electrode pairs may be configured in parallel and/or in series to multiply the efficacy of desalination. When in parallel, electrodes are configured in two or more conduits, and when in series, electrodes are configured sequentially in the same conduit. The electrodes and conduits may be modular in nature, with connectors at the inlet 120, and outlets 122,124, to allow custom configuration of the system. Fluid into the conduits may be accomplished and controlled in any suitable manner, and may be pumped or fed by gravity into the conduit, e.g. by collection of water at high tides or waves. Pumps may be controlled by solar power, or otherwise. Power may be directed to two or more electrode pairs either from the same power source or a different power source. For example a single solar panel and/or a single controller may power two or more electrode pairs. Because low voltages are used, power demands are likewise low. Voltages may be kept below 1.23V, to minimize water electrolysis.

The electrodes 110, 112 may be any electrode described herein that is prepared by carbonization of a porous organic material, such as porous plant material or gas-expanded viscoelastic matrix of a plant protein and/or polysaccharide-containing material. The resultant electrode has a hydraulic permeability of at least $0.5 \times 10^{-13}$ m$^2$ or at least $1.0 \times 10^{-13}$ m$^2$, for example, at least $0.5 \times 10^{-11}$ m$^2$ or at least $1.0 \times 10^{-11}$ m$^2$, as determined by application of Darcy's Law. The electrode is open-celled in that it permits sufficient flow-through of water by virtue of the interconnection of pores. Porous plant material has a suitable porosity to yield a hydraulic permeability of more than $0.5 \times 10^{-13}$ m$^2$. The porous plant product is "intact" in that it is structurally unmodified after carbonization, substantially retaining its native pore structure on carbonization, and is not physically restructured, e.g., by comminuting, crushing, grinding, or powdering the carbonized product and assembling or incorporating the material into a porous matrix. In the process of manufacturing an electrode, parts of the carbonized material may be sealed or glued, such as particularly large passages, as in the pith of some material, and as part of the insertion of a conductive non-metal rod, such as a graphite rod, into the material. As an example, red mangrove aerenchyma retains its native pore structure when carbonized, while red potato does not. Aerenchyma, such as mangrove aerenchyma, for example red mangrove aerenchyma is amendable to rapid carbonization at a high temperature, yielding a material suitable for use in a low pressure, flow-type capacitive deionization desalination system or method.

In another aspect, processed, gas-expanded viscoelastic plant material is useful for production of electrodes useful in low pressure, flow-type capacitive deionization desalination system or method. One common viscoelastic plant material type is gluten, which comprise prolamins and glutelins, and are present in wheat, and other grains, such as barley, rye, and oats, as well as wheat species and hybrids, and include triticeae glutens. Another type of viscoelastic plant material are polysaccharides, such as gums and starches, as are commonly used in the breadmaking arts. The processed viscoelastic plant proteins and polysaccharides may be expanded by leavening, such as with yeast, or by other methods, such as by use of baking soda, baking powder, or simply by trapping air, as is broadly-known in the baking arts, such as in making breads, cakes, or the like. Flours, starch products, gum products, and other baking additives as are well-known in the baking industry, including gluten-free substitutes, may be used to make the viscoelastic matrix for expansion. In preparation of the material useful in producing the electrodes described herein, the viscoelastic material is heated to a temperature sufficient to set the protein, starch, or gum constituents, and produce a stabilized porous matrix of the viscoelastic plant material, e.g., "baking" bread, e.g., at 150-180° C.

A carbonized, gas-expanded viscoelastic plant material as described, may have a hydraulic permeability of at least $0.5 \times 10^{-13}$ m$^2$. The material may be etched, e.g. with a base, such as KOH, to produce nanoscale pores, e.g. a hierarchical porosity. The carbonized, gas-expanded viscoelastic plant material may be carbonized bread, which includes as a class, cakes and other leavened baked goods, whether or not gluten is present. The bread product may be waste, e.g., from a bakery, supermarket, or restaurant. The "bread" or gas-expanded viscoelastic plant material need not be edible, or made from an edible material, and thus is not necessarily food. The gas-expanded viscoelastic plant material that is carbonized may contain gluten, and may contain wheat flour.

The porous plant material or expanded viscoelastic plant material may have a hydraulic permeability of at least $0.5 \times 10^{-13}$ m$^2$ after carbonization. The material is carbonized under anaerobic or hypoxic conditions. It may be carbonized in a furnace or in any fire, so long as the carbonization temperature is at least 450° C., at least 500° C., at least 700° C., at least 800° C., e.g., at ~600° C. as in a wood fire, or at 800° C. When carbonized in a furnace, the chamber of the furnace may be flushed with an inert gas, such as argon. When carbonized in a fire, the material may be placed in a fire-resistant vessel in an anaerobic area of the fire. In that case, the fire or fire pit may be arranged to include a hypoxic central area surrounded by the combustible material, and the material is placed within the hypoxic central area. A customized fire pit may be employed.

The pores of the electrode may have hierarchical porosity, which refers to the presence of micro-scale pores having dimensions of up to 1 mm, combined with nanoscale pores, having dimensions of less than 1 micrometer ($\mu$m, $\mu$, or micron) and typically less than 100 nm, significantly increasing the effective surface area of the electrode, and therefore deionization capacity. Hierarchical porosity may be present in the native plant product or gas-expanded viscoelastic plant material, or may be produced in the carbonized structure by etching, e.g., with KOH (e.g., as caustic potash). As shown in the examples below, hierarchical porosity may be produced by electrodeposition of bacteria lysis product on an electrode, followed by subsequent re-carbonization, e.g., at temperatures over 500° C., e.g., at approximately 800° C.

Carbonization is the process by which biomass is converted into a carbonized form by pyrolysis. It is an anaerobic process that occurs in the range of from 400° C. to 800° C. Carbonization yields a carbon structure as well as other products such as tars and volatiles, depending on the temperature of the pyrolysis reaction. For production of charcoal, wood is kiln dried at a temperature of up to 100° C., followed by further heating up to 450-800° C. The temperature of pyrolysis results in varying compositions of the carbonized products, with temperatures approaching 800° C. yielding polycyclic aromatic hydrocarbons (see, e.g., Kawamotoi, H., "Lignin Pyrolysis Reactions" (2017) *J. Wood Sci.* 63:117-132). As indicated, above and in the Examples below, previous carbonized electrode substrates do not retain useful structural form for use in electrodes, requiring binders or other matrix materials, or specialized pretreatments, in order to produce an electrode structure suitable for flow-based capacitive deionization desalination devices.

According to one aspect of the invention, provided herein is an electrode for use in a flow-based capacitive deionization desalination device. The electrode comprises an electrode body comprising architecturally intact carbonized porous plant portion or carbonized, expanded viscoelastic plant material attached to a suitable conductor, such as a graphite rod. The electrode body preferably has a hydraulic permeability of at least $0.5 \times 10^{-13} \ m^2$.

According to another aspect of the invention, provided herein is a method of making an electrode for use in a flow-based capacitive deionization desalination device. The method comprising preparing an electrode body comprising an intact carbonized porous plant product or carbonized, expanded viscoelastic plant material by carbonizing a porous plant product or expanded viscoelastic plant material at a temperature of at least 550° C. to yield an electrode body comprising an intact carbonized porous plant product or carbonized, expanded viscoelastic plant material, and electrically-connecting a non-metal conductor to the electrode body. The porous plant product may be aerenchyma, such as mangrove aerenchyma, e.g., red mangrove aerenchyma. The expanded viscoelastic plant material may be a bread. A device also is provided comprising the electrode inserted into a fluid conduit, and the rods or an electrical lead (e.g. wire or conductive trace) attached to the rods extending from the conduit. The rods and leads may be configured in any suitable manner for conducting electricity to the electrode bodies. The conduit is configured to direct fluid primarily through the electrodes, as opposed to around the electrodes. The electrode bodies may be affixed and sealed within the conduit in any manner, for example using silicone sealant. As would be appreciated by those of skill in the art, the structure and configuration of the conduit may vary greatly. Multiple conduit assemblies may be configured in series by any method, for example using any suitable fluid connection, such as a Luer-type connection system. Manifolds may be used to feed water into multiple conduits in a parallel configuration, optionally with one or more conduits also configured in series.

Also provided herein is a desalination system comprising a power source, such as a solar cell or solar panel, connected to a pair of electrodes. The electrodes comprise electrode bodies comprising intact carbonized porous plant product or carbonized, expanded viscoelastic plant material attached to a suitable conductor, such as a graphite rod, that electrically connects the electrode to a power supply. The electrodes are contained within a fluid conduit comprising an inlet and an outlet, with the fluid conduit being configured to direct water flow through the electrodes. The system comprises tubes, pipes, valves, or connectors for transferring water to and from the conduit, including an outlet structure comprising different outlets for desalinated water and hyper-salinated waste effluent. The system also comprises a switch for controlling electrical current through the electrodes from, the power source. The switch may be part of a controller that may be computer-implemented. The controller may comprise a processor and memory, and instructions for the processor to control electrical current to the electrodes from the power source, and optionally to control valves (e.g., solenoids) and/or pumps for managing the flow of liquids to, from, and through the conduit and electrodes, and for receiving data, such as data relating to salinity of effluent from the conduit, and controls current to the electrodes and water flow based on that data. The system may be used in a method of desalinating saltwater or brackish water.

EXAMPLES

Natural resources (e.g.—coconut shells, peanut shells, biochar, leaves) have been used for decades to make porous carbon electrodes by carbonization. After chemical or physical treatment of raw materials, activated carbons (ACs) exhibit high specific surface area, high electrical conductivity, and are low-cost due to abundancy. Because of these characteristics, ACs are one of the most commonly used materials for a wide range of electrode applications such as supercapacitors, Li-ion and Na-ion batteries, and CDI. Remarkably, the raw material is almost never used with its intact natural architecture, and is instead crushed and treated to generate a final material. Retaining the microscale structure of an evolutionarily designed, high porosity structure during carbonization was a compelling opportunity to solve some of the vexing challenges of FT-CDI.

In addition, globally, over 1 billion tons of food is wasted or lost on an annual basis. Among these materials, bread is one of the most wasted foods across the world. We hypothesized that bread would be an ideal material from which to generate a CDI electrode based on its high content of carbon due to plant-based ingredients, inherently porous microstructure, and tremendously high availability. Herein, we report the development of a sustainable bread-derived desalination system that can be deployed at very low cost. We fabricated freestanding electrodes with a hierarchical pore structure using both a conventional laboratory technique and a decentralized point-of-use technique with controlled heating from firewood. The bread-derived electrodes exhibited a competitive desalination performance in a FT-CDI system and one of the highest values for hydraulic permeability reported to date. Furthermore, when coupled with solar energy, the bread-derived desalination system produced good-quality drinking water from unpalatable salty water.

In the following examples, intact natural architecture of specific plant-derived and food waste-derived materials were employed to develop freestanding CDI electrodes with ultra-high hydraulic permeability and competitive desalination performances in comparison to common CDI electrodes. Importantly, our plant/waste-derived electrodes did not require additional materials (current collectors, binders, conductive additives) which are typically necessary for common CDI electrode fabrication.

Example 1—Aerenchyma-Based Electrode

When considering the need for micron-sized interconnected pores in FT electrodes we were captivated by the idea that if mangrove aerenchyma was conductive, it would be an ideal electrode. We therefore explored to what degree aerenchyma architecture and micro- or nanostructure were retained during carbonization. We used one-step carbonization of a plant with developed aerenchyma tissue (a biological adaptation) to enable highly-permeable, freestanding flow-through capacitive deionization electrodes. We showed that carbonized aerenchyma from red mangrove roots reduces the resistance to water flow through electrodes by 65-fold relative to carbonized common woody biomass. We then demonstrated the practical use of the intact carbonized red mangrove roots as electrodes in a flow-through capacitive deionization system.

Materials and Methods

Plant material and carbonization process. Red mangrove (*Rhizophora mangle*) plants (~1 meter tall) were grown indoors (20-25° C.) and provided with 16 g L−1 saltwater every 3-4 days as well as being grown in a 12-hour photoperiod. Common woody biomass samples were collected from non-specific woody trees (i.e.—plants that synthesize wood, also known as the secondary xylem, as their main structural component). RMRs and common woody biomass samples were cut to a length of approximately 7.5-10 mm immediately before carbonization. The carbonization was accomplished through heating the samples to 800° C. for 1 hour under 95-100 cm³ min−1 argon flow at a heating rate of 5° C. min−1 in a Lindberg 54553-VH tube furnace. After carbonization, the samples were rinsed with DI H₂O three times and then dried at 80° C. for at least 6 hours. The length and diameter of the RMR samples post-carbonization ranged from 5.5-7.5 mm and 7.0-9.5 mm, respectively. The mass of each sample ranged from 25-45 mg.

In preparation for examining the hydraulic permeability and integrations into the FT-CDI experiments, the pith (center) of each sample was filled with epoxy to limit water transport to the aerenchyma and the secondary xylem, which represents the bulk of the cross-section for RMRs and common woody biomass, respectively. In preparation for the FT-CDI experiments, approximately 250 mL of DI H₂O was delivered through the aerenchyma of the carbonized RMRs to remove residual salts and minerals. After each FT-CDI experiment, 50 mL of DI H₂O was delivered through the aerenchyma of the carbonized RMRs. The samples were then dried at 80° C. for at least 6 hours and stored at room temperature until further testing.

Imaging and cross-sectional pore area analysis. The structure of the aerenchyma tissue was determined by imaging the natural plant autofluorescence using a Zeiss Cell Observer Spinning Disk Confocal Microscope (excitation-488 nm; emission-525 nm). Layers of these images were processed and combined together to create 3D image stacks. Post-carbonization images were generated by scanning electron microscopy (SEM) using a Jeol JSM 6400 and Philips XL-30 FEG SEM.

Cross-sectional area analysis of the tube-like structures in the aerenchyma of the carbonized RMR and in the secondary xylem of the carbonized common woody biomass samples was done using ImageJ. SEM images were converted to black-and-white images using the automatic thresholding tool in ImageJ. The periphery of each pore was then identified using the particle analysis tool, which calculated the cross-sectional area for each element. Pores that intersected the scale bar or that were cut off at the edge were not considered for analysis.

Characterization. The specific surface area of the carbonized mangrove root samples was characterized by Brunauer-Emmet-Teller (BET) for nitrogen adsorption isotherms using a Micromeritics Gemini VII Surface and Porosity instrument. Raman spectroscopy was performed by NT- MDT NTEGRA spectra using a laser power of 2.38 mW and 532 nm excitation. The spectra were recorded with an acquisition time of 30 seconds at five separate locations on three independently prepared carbonized RMRs. The $I_D/I_G$ ratio was calculated using the peak intensity at the D-band and G-band. EDX was performed using a Philips XL-30 FEG SEM. Measurements were conducted at three separate locations on four independently prepared carbonized RMRs.

Hydraulic permeability. Flow velocity through carbonized plant tissue was examined using a water column pressure system. Samples were wrapped in Parafilm and connected to the bottom of a water column using a custom-fabricated silicone coupling. The samples were wrapped in Parafilm to direct the bulk flow of water through the carbonized tissue rather than between the sample and the coupling. The time for the meniscus of the water column to drop 2 cm, which equalled a permeate volume of 1 mL, was recorded and used to calculate the flow rate for six different applied pressures ranging from 0.96-2.04 kPa. The applied pressure was calculated by averaging the pressure head of the water column before and after 1 mL of water permeated through the plant tissue based on:

$$\Delta P = \rho g (H - \Delta h/2)$$

where $\Delta P$ is the pressure, $\rho$ is the density of water, g is the acceleration of gravity, H is the height of the water column before any water permeated through the carbonized plant tissue, and $\Delta h$ is the change in the height of the water column after 1 mL of water permeated through the carbonized plant tissue. The flow rate through each sample was normalized by the ratio of the sample length to the average sample length. This is important because the flow rate under a given applied pressure is inversely proportional to the length of the sample based on Darcy's Law. The normalized flow velocity of water through each sample was calculated by dividing the respective normalized flow rate by the available cross-sectional permeation area of each sample. The hydraulic permeability was calculated at each applied pressure using Darcy's Law:

$$\kappa = (Q\mu L)/(\Delta P A)$$

where $\kappa$ is permeability (m²), Q is flow rate (m³ s⁻¹), p is dynamic viscosity (Pa s), L (m) is length of the sample, $\Delta P$ (Pa) is the applied pressure differential, and A (m²) is the available cross-sectional area of the sample (total cross-sectional area−pith cross-sectional area).

Flow-through capacitive deionization. Flow-through CDI experiments were conducted in single-pass mode with an initial stopped-flow charging phase. Two carbonized RMRs were individually wrapped in Parafilm and arranged in series approximately 1-3 mm apart through a custom-fabricated silicone coupling. The length and diameter of the RMR electrodes ranged from 5.5-7.5 mm and 7.0-9.5 mm, respectively. The carbonized RMRs were connected to a DC power supply (BK Precision Model 1670) through 0.3 mm graphite rods. Three independently prepared carbonized RMR electrode pairs with a net mass of 58.3, 70.4, and 83.9 mg were tested. In each experiment the FT-CDI cell was initially dry. A 1200 mg L−1 NaCl solution was then delivered through the FT-CDI system for approximately 15 minutes at a flow rate of 0.475 mL min-. The flow was then stopped for 15, 45, or 135 minutes while a potential of 1.5 V was applied to the FT-CDI cell. After the stopped-flow charging phase, flow was reinitiated for 30 minutes at 0.475 mL min−1 while maintaining the applied voltage potential.

The NaCl concentration of the permeate from the FT-CDI cell was calculated using conductivity measurements with a custom-built flow-through system. A calibration curve which related salt concentration to conductivity was generated before and after each experiment by flowing NaCl standards ranging from 800-1300 mg $L^{-1}$ through the conductivity meter. Salt adsorption was calculated by measuring the area under the curve of the permeate during the 30-minute flow phase with respect to the stock salt concentration of 1200 mg $L^{-1}$. Control experiments were performed to determine the accuracy of our measurement and calculation techniques for quantifying the change in salt concentration and total salt adsorption.

The charging current in each experiment was measured using a Fluke 287 multimeter with a sampling frequency of 0.5 Hz. The charge efficiency was calculated according to:

$$\Lambda = (\Gamma * F) / \Sigma$$

where $\Gamma$ is the salt adsorption capacity (mol $g^{-1}$), F is the Faraday constant (96485 C $mol^{-1}$), and $\Sigma$ is the net charge passed through the CDI circuit from the power supply (C $g^{-1}$). The net charge was calculated by integrating the charging current with respect to time. The ASAR during cyclic operation was calculated by dividing the SAC measured from the 15-minute flow phase by the total cycle time (60 minutes).

Statistical analysis. All statistical analysis was conducted using a two-tailed paired Student's t-test.

Results

Figure 2:
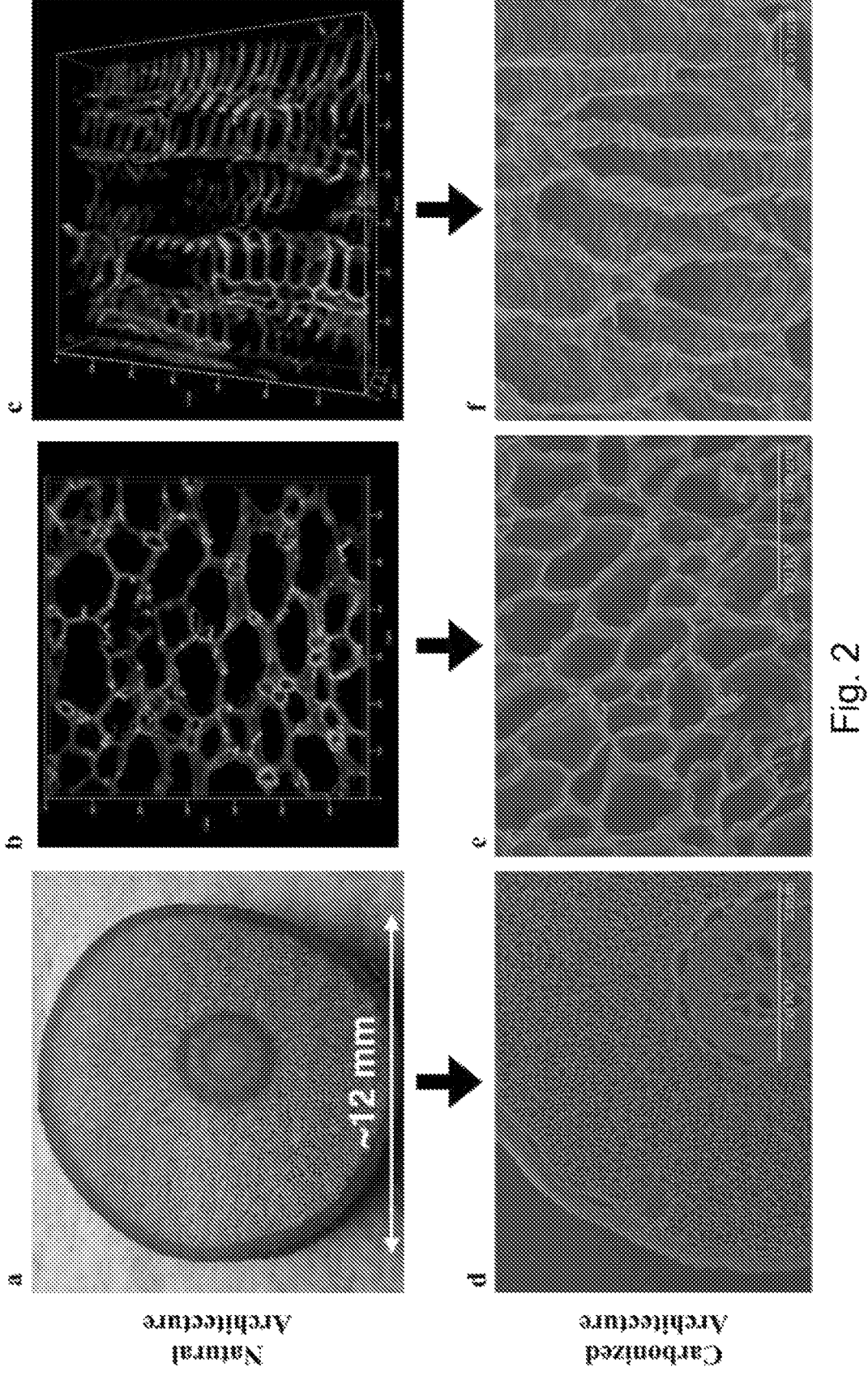
FIG. 2. Porous architecture of aerenchyma tissue from RMR for the bioinspired FT-CDI electrodes before and after carbonization. Carbonization was achieved through thermal treatment at 800° C. for 1 hour under argon flow. (a) Digital image of the cross-section of the RMR; (b) Confocal image of the autofluorescence of the cross-section for the aerenchyma tissue indicating the porous structures in the tissues; (c) Confocal longitudinal image of the autofluorescence for the aerenchyma tissue indicating the repeatable architecture along the length of the tissue; (d) Scanning electron microscope (SEM) image of the cross-section of the carbonized RMR indicating the overall structure of the root is maintained through the carbonization process; (e) Higher magnification SEM image of the carbonized cross-section for the aerenchyma tissue indicating the porous architecture of the tissue is well-maintained through the carbonization process; (f) SEM longitudinal image of the carbonized aerenchyma tissue indicating the repeatable architecture along the length of the tissue is well-maintained through the carbonization process.

Carbonized mangrove root structure and characteristics. To develop a biologically derived FT-CDI system we first determined whether carbonization would destroy the low-resistance structure in aerenchyma tissue of the RMR. We used a combination of confocal microscopy and electron microscopy to compare the microstructure before and after carbonization (FIG. 2). We found that, on average, the RMRs retained approximately one third of their dry weight after carbonization with a dramatic retention of microstructure. We imaged the naturally occurring autofluorescence in the tissue of the RMR to observe the structure of the aerenchyma in a fresh, unaltered state. Using our 2D confocal images we generated 3D constructions of the aerenchyma in both the transverse and longitudinal directions (FIG. 2 (b,c)). The natural architecture of the aerenchyma was composed of tube-like structures that were extremely well retained after carbonization (FIG. 2 (e,f)). A higher magnification image revealed that there were interconnecting pores in the longitudinal walls of the tubular structures. These structures have been found in the aerenchyma of other mangrove species and, if retained after carbonization, we hypothesized that they would keep flow resistance low in a FT-CDI system, thus enabling a high-efficiency desalination.

To further understand the structure of the carbonized RMR, we investigated the carbon structure, chemical composition, and specific surface area through Raman spectroscopy, energy-dispersive X-ray (EDX) spectroscopy, and Brunauer-Emmet-Teller (BET) analysis for nitrogen adsorption isotherms. The Raman peaks at 1336 $cm^{-1}$ and 1585 $cm^{-1}$ represented the defect (D) and graphitic (G) bands of carbon. The high $I_D/I_G$ ratio, ranging from 1.05-1.15, indicated that disorder existed in the carbon matrix. EDX analysis showed high carbon content in the carbonized RMRs with trace amounts of Mg, O, Cl, and Ca. The specific surface area of the carbonized RMRs was between 3 to 216 $m^2$ $g^{-1}$. Although this range was large, micro/macro-scale features of the harvested aerenchyma (the cross sectional area of tubular structures) would be expected to vary within the root of the mangrove plant as a function of specific root type, distance from the root apex, and developmental maturity.

Figure 3:
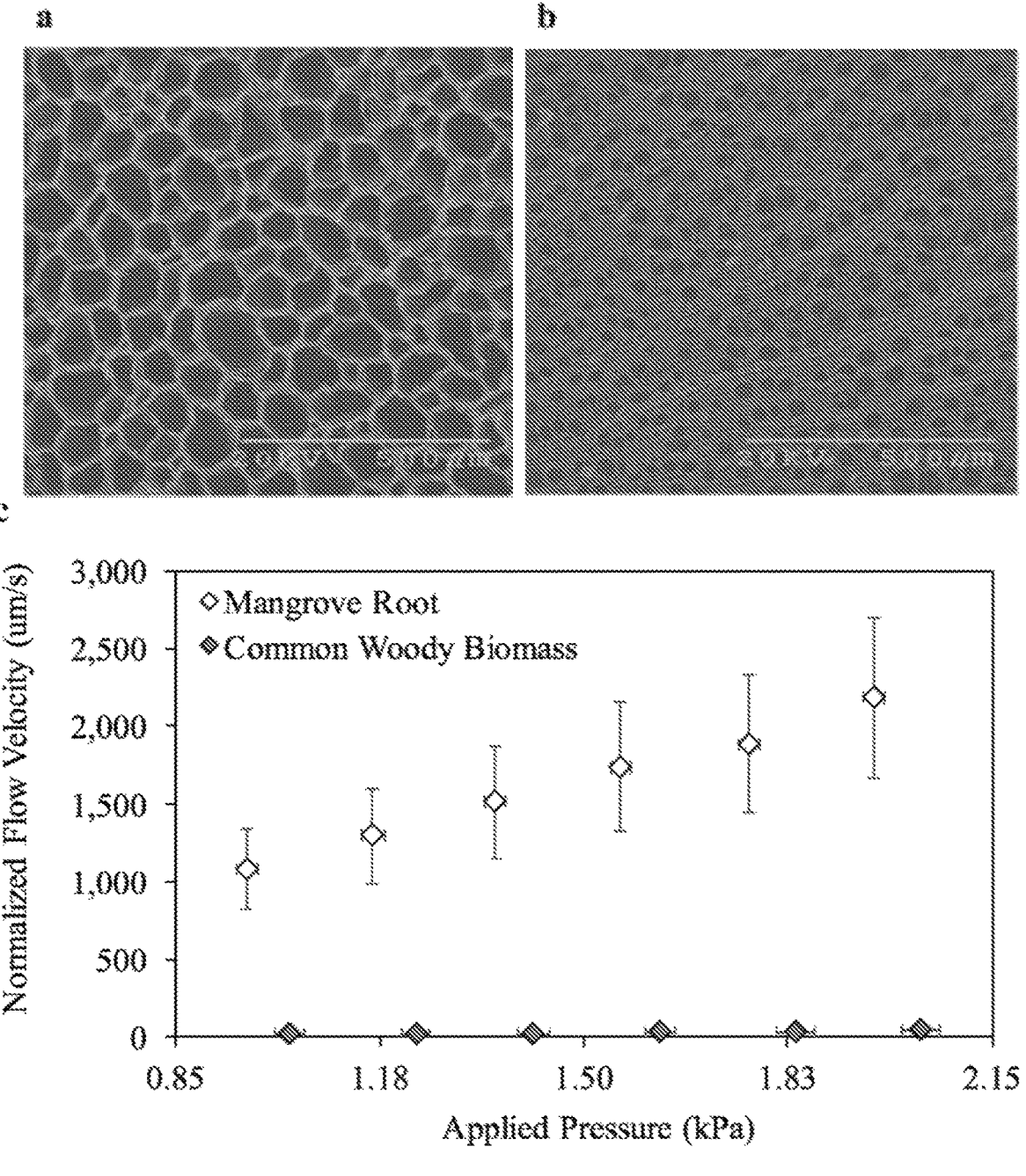
FIG. 3. Hydraulic permeability of water flowing through carbonized RMR and common woody biomass. (a) SEM image of tube-like structures in the carbonized RMR aerenchyma; (b) SEM image of tube-like structures in the carbonized secondary xylem of common woody biomass; (c) Normalized flow velocity through each respective carbonized structure versus applied pressure indicating aerenchyma of carbonized RMR (black diamonds) had approximately 65 times less resistance to water permeation than secondary xylem of carbonized common woody biomass (red diamonds). Mean+/−s.e.m., n=8 (carbonized RMR) and n=3 (carbonized common woody biomass) independent experiments.

Flow-through characteristics of carbonized mangrove root and common woody biomass. We next compared the structure of the carbonized RMR to other plants which lacked aerenchyma. We carbonized non-specific common woody biomass from trees that do not grow in high salinity or oxygen deprived environments. Within these trees the secondary xylem occupied most of the cross-section and contained tube-like structures, similar to the aerenchyma in RMRs. Detailed microscopic comparisons of the carbonized plant tissues (FIG. 3 (a,b)) revealed that the average cross-sectional area of the tube-like structures in the aerenchyma was approximately 10 times more than that of the secondary xylem. Furthermore, the total cross-sectional area percentage that the tube-like structures occupied, which represents potential permeation area for water flow, was 18% higher in the aerenchyma when compared to the secondary xylem. These points suggested that the aerenchyma would provide less resistance to water flow in comparison to the secondary xylem. To understand this approach further, we predicted the permeability of both structures using a bundle of capillaries model for FT-CDI electrodes. The permeability was expressed as:

$$\kappa = \varepsilon r^2 / 8\tau$$

where $\varepsilon$ is the porosity of the carbonized cross-section, r is the radius of the tube-like structures, and $\tau$ is the tortuosity of the tube-like structures. The porosity was estimated to be the total cross-sectional area percentage that the tube-like structures occupied in the aerenchyma or secondary xylem; unity was assumed for tortuosity. The permeability of the aerenchyma was predicted to be an order of magnitude greater than that of the secondary xylem.

To determine experimentally if the aerenchyma posed less resistance to water flow than the secondary xylem, we measured the flow velocity of water through each carbonized structure at low pressures. The flow velocity through the carbonized RMR was on average 65 times faster when compared to the common woody biomass at similar pressures (FIG. 3 (c)). The large difference in flow resistance between the samples in comparison to the theoretical calculations was likely due to a portion of the tube-like structures in the secondary xylem being closed-cell, where the water could permeate into the structure but not through it. In addition, a portion of the tube-like structures in the aerenchyma may not extend all the way through the carbonized RMR samples. However, interconnecting pores between the tubes could allow for radial flow, enabling an otherwise closed-cell to conduct water. The average hydraulic permeability of the carbonized RMR ($1.13 \times 10^{-11}$ $m^2$) was calculated to be 65-fold greater than that of the common woody biomass ($1.66 \times 10^{-13}$ $m^2$) and on the same order of magnitude as the highest reported value for flow-through electrodes (Guyes, E. N. et al., "Several orders of magnitude increase in the hydraulic permeability of flow-through capacitive deionization electrodes via laser perforations" (2017) *RSC Advances* 7:21308-21313).

Desalination performance of intact mangrove root electrodes in flow-through capacitive deionization system. After demonstrating that the intact carbonized RMR exhibited high flow-through characteristics, our next objective was to characterize their performance as electrodes in a FT-CDI system. We used a flexible, custom-fabricated silicone coupling to maintain the carbonized RMR in series. The coupling fit tightly around the outer diameter of the carbonized RMR and directed water flow through the aerenchyma. To provide power for the desalination, the electrodes were connected to a power supply using 0.3 mm graphite rods, which were pressed through the coupling and brought into contact with the carbonized RMR.

The FT-CDI experiments were conducted in single-pass (SP) mode with an initial stopped-flow charging (salt adsorption) phase. The SP mode more closely resembles a CDI application, although the CDI cell can also be charged while continuously recycling the feed solution as batch-mode (BM). In FT-CDI experiments the electrodes were initially dry and then a 1200 mg $L^{-1}$ NaCl solution was pumped through the carbonized RMRs at 0.475 mL $min^{-1}$ for approximately 15 minutes. The flow was then stopped and a potential of 1.5 V was applied to the carbonized RMRs for 15, 45, or 135 minutes. After the initial stopped-flow charging stage, the stock 1200 mg/L NaCl solution was pumped into the FT-CDI cell at 0.475 mL $min^{-1}$ for 30 minutes while the voltage potential was maintained. The partially desalinated volume in the carbonized RMRs was subsequently displaced and flowed downstream to the con-ductivity meter. The salt concentration downstream of the FT-CDI cell was 1200 mg $L^{-1}$ until flow resumed.

Figure 4:
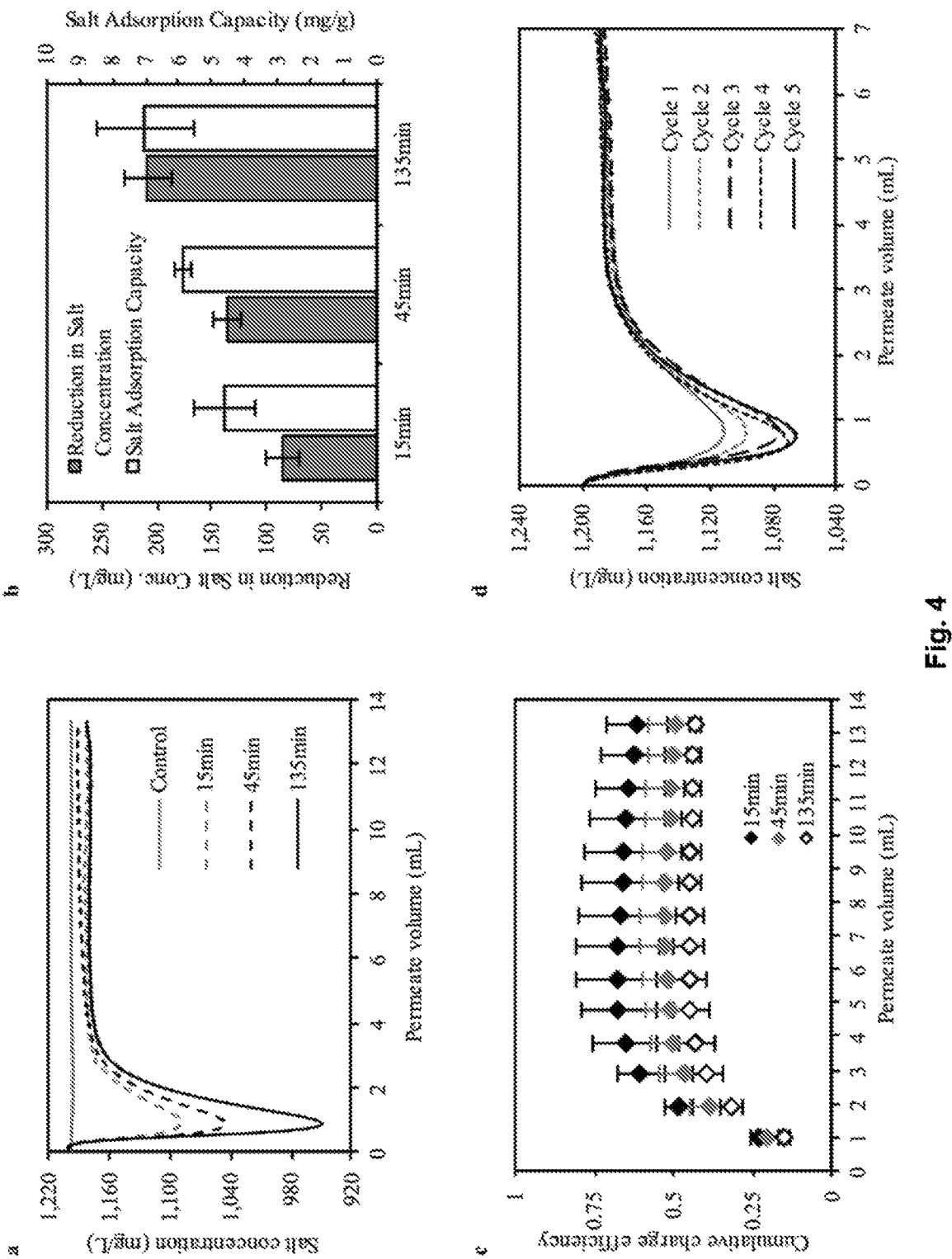
FIG. 4. Capacitive deionization performance of bioinspired FT-CDI system utilizing carbonized RMR as electrodes that have little resistance to water flow. (a) Representative experiment of salt concentration of permeate from bioinspired FT-CDI system after 15, 45, and 135 minutes of stopped-flow charging at an applied potential of 1.5 V with carbonized RMR electrodes (net mass=58.3 mg). The control is with an identical system and operation for a stopped-flow charging time of 45 minutes without carbonized RMRs. (b) Increasing stopped-flow charging time enabled larger reductions in salt concentration (Mean+/−s.e.m., n=3 independent experiments, *p<0.05), (c) but tended to reduce the charge efficiency of the bioinspired FT-CDI system. (d) Salt concentration of permeate from bioinspired FT-CDI system during cyclic operation. The reduction in salt concentration of the permeate from the FT-CDI cell, $\Lambda$ and ASAR noticeably increased after the first cycle.

The change in salt concentration over time was an impor-tant measure of how well our mangrove-inspired CDI sys-tem functioned. The sharp decrease in salt concentration at the start of the 30-minute flow phase (FIG. 4 (a)) was the displaced volume from one pair of carbonized RMRs. We tested multiple independently prepared sets of carbonized RMRs to investigate how reproducible the performance was in the FT-CDI system. The total mass of the electrode pairs was 58.3, 70.4, and 83.9 mg. For each pair of electrodes, increasing the stopped-flow charging time enabled the car-bonized RMRs to adsorb more salt, which resulted in greater reductions in feed concentration (FIG. 4 (b)). The highest reduction in feed concentration we observed was 250 mg $L^{-1}$. As flow continued, the salt concentration of the per-meate gradually returned to the concentration of the feed solution. Even after a stopped-flow charging time of 15, 45, or 135 minutes and 30 minutes of flow, the carbonized RMRs were still adsorbing salt (the permeate solution did not return to 1200 mg $L^{-1}$). The extended time to reach a saturated state was most likely due to the large length of, and gap between, the electrodes (the electrodes were approxi-mately 5 and 40 times the length and gap, respectively, of other reported FT-CDI systems). Surprisingly, although the carbonized RMRs did not reach a saturated state, they still exhibited an average SAC as high as 7 mg $g^{-1}$ (FIG. 4 (b)) and a maximum observed SAC of 9.6 mg $g^{-1}$. This SAC is competitive with recently reported FT-CDI electrodes (Table 1 (FIG. 5)) and biomass-based CDI electrodes (Table 2 (FIG. 6)). Furthermore, our intact mangrove root electrodes require far less fabrication material and processing com-pared to most FT and biomass-based electrodes (FIGS. 5 and 6).

We further examined the performance of the carbonized RMRs in the FT-CDI system by calculating the charge efficiency ($\Lambda$), which is the ratio of salt adsorbed to the electric charge that accumulated in the electrode pair. Energy consumption for the CDI process normally decreases with increasing $\Lambda$, therefore, values as close to unity (theo-retical maximum) are highly desirable. Common reported values for $\Lambda$ range between 0.5 to 0.8. We observed an average $\Lambda$ of 0.62, 0.50, and 0.43 for stopped-flow charging times of 15, 45, and 135 minutes, respectively (FIG. 4 (c)) relative to the end of the 30-minute flow phase. The maximum $\Lambda$ during the flow-phase was reached at a permeate volume of approximately 6 mL and then decreased thereaf-ter.

CDI systems are continuously cycled through adsorption and desorption phases to produce a desalted solution and brine solution, respectively. Therefore, we also investigated the desalination performance of the carbonized RMRs when operated cyclically. In each cycle the flow was first stopped for 15 minutes and a potential of 1.5 V was applied. Next, flow was initiated at 0.475 mL $min^{-1}$ while maintaining the applied potential for 15 minutes. Finally, the potential was reduced to 0 V and flow continued for 30 minutes. We observed a sharp decrease in salt concentration as the partially desalinated solution was being displaced from the carbonized RMRs when the flow was initiated (FIG. 4 (d)). Interestingly, the performance of the carbonized RMRs increased after the first cycle.

A larger reduction in feed concentration was observed, as well as an increased $\Lambda$ and average salt adsorption rate (ASAR). The FT electrode arrangement has been shown to enable a higher ASAR, which allows more desalinated water to be produced in a given time frame. The ASAR of the mangrove-based CDI system during cyclic operation ranged between 0.063 to 0.075 mg $g^{-1}$ $min^{-1}$, which was not as fast as some FT-CDI systems, but comparable to FB-CDI sys-tems. As previously mentioned, however, the length of, and gap between, the carbonized RMR electrodes were much larger than fully optimized FT-CDI systems and would be expected to decrease the ASAR. Lastly, the charging current for each cycle was very consistent and exhibited a repeatable increase when flow was initiated after the stopped-flow charging phase. Once the applied potential was reduced to 0 V, the current direction reversed (discharge current).

In this example, work, we demonstrated that the intact natural architecture of a biomass can serve as an effective and easily fabricated, low-cost intact FT-CDI electrode. The carbonized RMRs were shown to decrease the feed concen-tration of a 1200 mg $L^{-1}$ salt solution by as much as 250 mg $L^{-1}$ and exhibit a SAC as high as 9.6 mg $g^{-1}$. We also demonstrated that the properties of the biomass have impor-tant implications on the performance of the electrodes. Biological adaptations, such as the development of aeren-chyma tissue, improve the hydraulic permeability of the freestanding electrode by almost two orders of magnitude in comparison to common plant structures. Intact carbonized plant materials couple the exquisite designs of nature with the ruggedness of the synthetic world.

Example 2—Bread-Based Electrode

Moving towards a more sustainable approach, we also created freestanding capacitive deionization electrodes from food waste (bread). Each year approximately 1.3 billion tons of food is either wasted or lost. One of the most wasted foods in the world is bread. Our bread-derived electrodes pos-sessed a hierarchical pore structure that enabled both high salt adsorption capacity and one of the highest reported values for hydraulic permeability to date in a flow-through capacitive deionization system. We also developed a sus-tainable technique for electrode fabrication that does not require the use of common laboratory equipment and that could be deployed in developing countries with low-finan-cial resources. To accomplish this, we developed a firewood-based carbonization technique to produce bread-derived electrodes. After coupling the firewood-based electrodes with energy from inexpensive solar panels, we were able to produce drinking water from unpalatable salty water.

Materials and Methods

Electrode fabrication (Laboratory-based). Bread (Pepperidge Farm® Stone Ground 100% Whole Wheat) was cut into 20×20×4 mm cubes and 60 mm long graphite rods (0.5 mm diameter) were inserted into the samples. The bread blocks were then dried at 80° C. between two pieces of acrylic for approximately 4 hours. The samples were carbonized in a Lindberg 54553-VH tube furnace at 800° C. for 1 hour under 95-100 cm³ min⁻¹ nitrogen flow at a heating rate of 5° C. min⁻¹. Following carbonization, the samples were washed with DI water 3 times and dried at 80° C. for at least 3 hours. The samples were then soaked in a 3.5 M KOH solution for 2 hours at a KOH:sample mass ratio of 3.5:1. Immediately following KOH treatment the samples were heated to 800° C. for 1 hour under 95-100 cm³ min⁻¹ nitrogen flow at a heating rate of 5° C. min⁻¹. The samples were thoroughly rinsed by flowing DI water through the porous carbon structure. The final dimensions of the electrodes were approximately 12.7×12.7×2.6 mm.

Electrode fabrication (Fire-based). The bread was cut into 8 mm thick blocks with a (width)×(length) ranging from 20×20 mm to 75×62.5 mm. Then, 100 mm long graphite rods (0.7 mm diameter) were inserted into the bread blocks. The samples were put into a metal container with a small hole (~1 cm diameter) in the top of it and placed in the middle of a square-lined fire for 1 hour. Firewood was added the fire around the samples to increase temperature and minimize oxygen content. After 1 hour, the samples were recovered from the fire and the metal can housing the samples was immediately placed top down on the ground. This was done to minimize the amount of oxygen diffusing into the can through the small hole in the lid. The samples were washed with DI water 3 times and dried at 80° C. for at least 3 hours. The samples were then soaked in a 3.5 M KOH solution for 2 hours at a KOH:sample mass ratio of 3.5:1. Immediately following KOH treatment the samples were again heated in the high temperature fire for 1 hour. Following thermal treatment, the samples were thoroughly rinsed by flowing DI water through the porous carbon structure.

Characterization. The structure of the freestanding carbonized bread was characterized by scanning electron imaging (SEM) on an FEI Quanta 600 FEG SEM. Specific surface area was determined by the Brunauer-Emmet-Teller (BET) method for nitrogen adsorption isotherm using a Micromeritics Gemini VII Surface and Porosity instrument. Pore distribution was based on the Barret-Joyner-Halenda (BJH) model for the adsorption isotherm. Raman spectroscopy was performed by NT-MDT NTEGRA spectra. The acquisition time was 30 seconds, the laser power was 2.38 mW, and the excitation was 532 nm. Mechanical analysis was examined using a TA Instruments RSA-G2 Solids Analyzer with an axial loading rate of 20 um s⁻¹. Compressive failure strength was classified by a sharp drop off in the stress-strain curve.

The applied pressure needed to retain a defined flow rate of water through the bread electrodes was examined. The flow rate was controlled through using a syringe pump (New Era Pump System Inc., Model NE-300) and the upstream pressure was measured through a pressure sensor (Honeywell ASDX005G24R) mounted to an Arduino UNO R3. The output voltage from the pressure sensor was correlated to applied pressure through a calibration curve obtained immediately before testing. Three pairs of carbonized bread electrodes arranged in series were used for testing. The permeation area was approximately 100 mm² and the average thickness of each electrode was 2.6 mm. The hydraulic permeability was calculated according to Darcy's Law:

$$\kappa = (Q\mu L)/(\Delta PA)$$

where $\kappa$ is permeability (m²), Q is flow rate (m³ s⁻¹), $\mu$ is dynamic viscosity (Pa s), L (m) is total length of the electrodes, $\Delta P$ (Pa) is the applied pressure differential, and A (m²) is permeation area.

Flow-through capacitive deionization experiments. Two bread electrodes with dimensions of approximately 12.7×12.7×2.6 mm and a net mass of 165 mg were arranged in series in a FT-CDI device. Two nylon membranes (Millipore NY20) were used as insulators to separate the electrodes by approximately 110 um. A solution of 1200 mg L⁻¹ NaCl was delivered through the electrodes at 0.3 mL min⁻¹ and cycles of charging-discharging were applied at 1.2 V-0 V. Each cycle lasted 180 minutes with an even charge-discharge duration. The salt concentration of the solution exiting the FT-CDI cell was measured using a custom-built conductivity meter which is described in detail in Wood et al. 2019 (Wood, A. R. et al., "Intact mangrove root electrodes for desalination" (2019) *RSC Advances* 9:4735-4743). The salt adsorbed was calculated by quantifying the area between the stock solution (1200 mg L⁻¹) and the permeate solution during the charging phase of the CDI cycle. The SAC was calculated by dividing the salt adsorbed by the net mass of the electrodes. Charge efficiency was calculated by: $\Lambda = (\Gamma * F)/\Sigma$, where $\Gamma$ is the salt adsorbed (mol g⁻¹), F is the Faraday constant (96485 C mol⁻¹), and E is charge transferred (C g⁻¹).

FT-CDI experiments with multiple electrode pairs arranged in series were conducted in continuous flow mode at a rate of 0.36 mL min⁻¹ with a 1200 mg L⁻¹ NaCl solution. The electrode pairs had an average mass of 194 mg and were spaced approximately 1.75 mm apart in the FT-CDI device. Nylon membranes were used as insulators between the individual electrodes in each pair and separated the electrodes by approximately 110 um. First, six charge-discharge cycles at 1.2 V-0 V were applied to all five electrode pairs. The total duration of each cycle was 180 minutes with an even charge-discharge phase. The first three cycles were used to condition the electrodes. Then, the first and second electrode pairs in reference to the cell inlet were disconnected from the power supply and three charge-discharge cycles were applied to the remaining pairs. Finally, the third and fourth electrode pairs were disconnected from the power supply and three charge-discharge cycles were applied to the fifth pair.

Solar-powered desalination with fire-based bread electrodes. Two bread electrodes with dimensions of approximately 15×15×4 mm and a net mass of 200 mg were submerged in a 3 mL reservoir of 1200 mg L⁻¹ NaCl solution. The electrodes were briefly degassed (60 seconds or less) to remove air and a nylon membrane was place between the electrodes for electrical insulation. The electrodes were connected to a 1.5 V solar cell (AMX3D 1.5 V; 400 mA; 80×60 mm) and placed outside for 2.5 hours in the afternoon during the month of February in Pittsburgh, Pennsylvania, USA. After charging, the electrodes were briefly removed from the reservoir and the remaining volume was removed from the housing device and tested to determine the NaCl concentration. An equivalent volume of stock NaCl solution (1200 mg L¹) was immediately inserted back into the housing device and the electrodes were placed back in the reservoir without being connected to the solar cell. After 2 hours, the salt concentration of the reservoir was characterized.

Statistical analysis. All statistical analysis was conducted using a two-tailed paired Student's t-test.

Results and Discussion

Synthesis of freestanding bread-derived electrodes with high surface area. Our first objective was to determine if we could create freestanding carbon electrodes derived from bread. We carbonized bread at 800° C. for 1 hour using a conventional laboratory tube furnace and inert gas supply. A digital image of the carbonized material is shown in FIG. 7 (a). The carbonized bread was intact/freestanding and had a structural appearance that was very similar to the bread before carbonization; the findings are supported by others who have used plant-based ingredients. Scanning electron microscopy (SEM) revealed that the carbonized bread was comprised of a large interconnected pore network (FIG. 7 (b,c)) which could potentially enable low-resistance to water transport in a FT system.

The specific surface area of CDI electrodes is one of the primary factors that influences desalination performance. It is typically desirable to have high surface area materials as this usually leads to a high capacity for salt adsorption. To characterize the surface properties of the carbonized bread we used nitrogen adsorption and Brunauer-Emmet-Teller (BET) analysis. BET analysis of the gas adsorption isotherm (FIG. 8 (a)) revealed that the specific surface area of the native carbonized bread was approximately 1 $m^2\ g^{-1}$, which was 2-3 orders of magnitude less than that of high-performance CDI electrodes.

Figure 8:
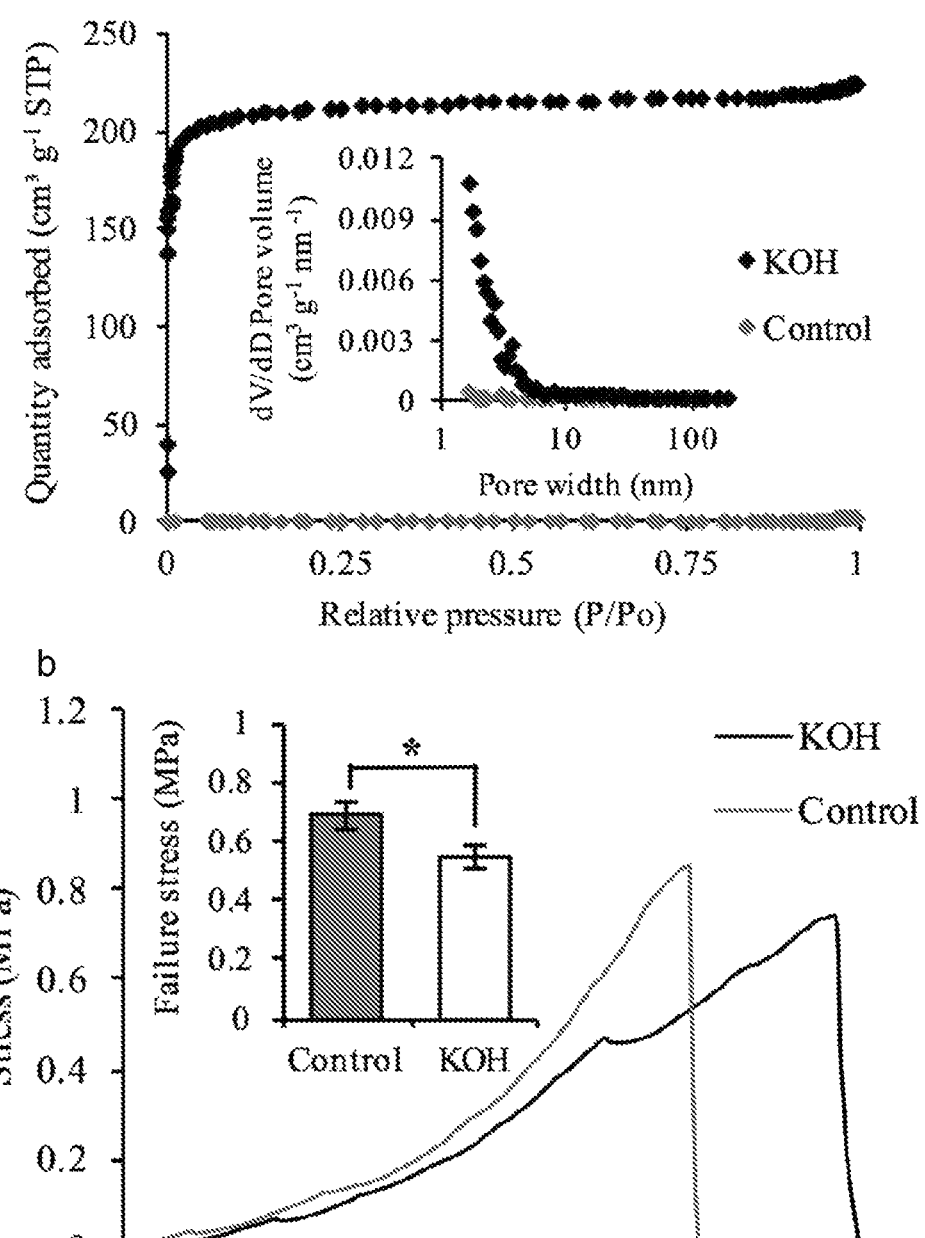
FIG. 8. Characterization of bread-derived electrode surface properties and structural stability. (a) Nitrogen adsorption isotherm for intact bread electrodes before and after KOH treatment. Insert is pore size distribution for non-activated and KOH-activated bread electrodes. (b) Representative stress-strain curve obtained from low-level compressive testing with freestanding bread electrodes before and after KOH treatment. Insert is the failure stress for non-activated and KOH-activated bread electrodes (mean+/−s.e.m.).

To increase the specific surface area of the carbonized bread, we used potassium hydroxide (KOH) activation. Briefly, chemical reactions between KOH and carbon at elevated temperature resulted in surface etching. The surface etching introduced porosity on the order of nanometers and ultimately led to an increased specific surface area of the material. Carbonized bread was soaked in a 3.5 M KOH solution for 2 hours and then heated to 800° C. for 1 hour in an inert atmosphere. After thoroughly washing the KOH-treated sample, the surface properties of the carbonized bread were once again investigated using nitrogen adsorption and BET analysis. In FIG. 8 (a), the increased quantity of adsorbed gas at similar partial pressures for the KOH-treated bread in comparison to the native bread indicated a higher specific surface area. BET analysis determined the specific surface area of the freestanding KOH-treated bread to be over 650 $m^2\ g^{-1}$; the increase in surface area was due to the introduction of surface porosity via etching. This was exemplified by the increased pore volume on the order of nanometers for the KOH-treated bread in comparison to the native bread (FIG. 8 (a), inset). Interestingly, we found that the interconnected pore structure of bread plays a crucial role in enabling high specific surface area after KOH activation. We mechanically pressed the bread prior to initial carbonization to eliminate the inherent pore structure on the order to tens to hundreds of micrometers and then chemically activated the carbonized pressed bread with KOH as previously described. This resulted in a reduction in specific surface area by greater than 100-fold.

Evaluating structural stability of freestanding bread-derived electrodes. The KOH-treated bread had a structural appearance that was almost identical to that of native bread (FIG. 7 (a-c)) and a similar surface appearance on the order of microns. However, one side effect of KOH treatment is that material loss through etching is inevitable. For example, the total dry-mass of bread retained through initial carbonization was 26%. After chemical activation, the total dry-mass of bread retained dropped to 20%. We were concerned that material loss would have adverse effects on the structural stability of the freestanding electrodes. If severe, the bread-derived electrodes were too brittle to handle and introduce into a FT-CDI system.

To investigate this issue, we mechanically tested native and KOH-treated bread. Our goal was to determine the average compressive stress at which each sample experienced brittle fracture. A representative stress-strain curve for the native and KOH-treated bread is shown in FIG. 8 (b). The sharp drop-off in each representative curve was the compressive stress at which brittle fracture occurred. We found that KOH treatment reduced the mechanical strength of the freestanding bread electrodes. The native and KOH-treated samples had an average failure stress of 0.69 MPa and 0.55 MPa, respectively (FIG. 8 (b), inset). Although chemical activation reduced the mechanical strength of the freestanding electrodes, the magnitude at which failure occurred indicated that the KOH-treated bread was sufficiently strong. A KOH-treated freestanding electrode with a 6×6 mm square cross-section could theoretically support a mass of 2 kg.

Performance characterization of bread-derived electrodes in a FT-CDI system. We hypothesized that our freestanding bread electrodes would be ideal for a FT-CDI system. The large interconnected pore structure on the order of 10s to 100s of microns could facilitate high fluid transport while the high specific surface area could enable high salt adsorption. We characterized the water transport properties of the freestanding carbonized bread by constructing a FT cell to house the electrodes while measuring the pressure differential across the cell at varying flow rates. We used Darcy's Law to calculate the average hydraulic permeability of the carbonized bread to be $2.32\times10^{-11}\ m^2$, which is one of the highest reported values for FT-CDI electrodes and 5 orders of magnitude greater than the reported value for a commercially available porous carbon electrode.

Figure 9:
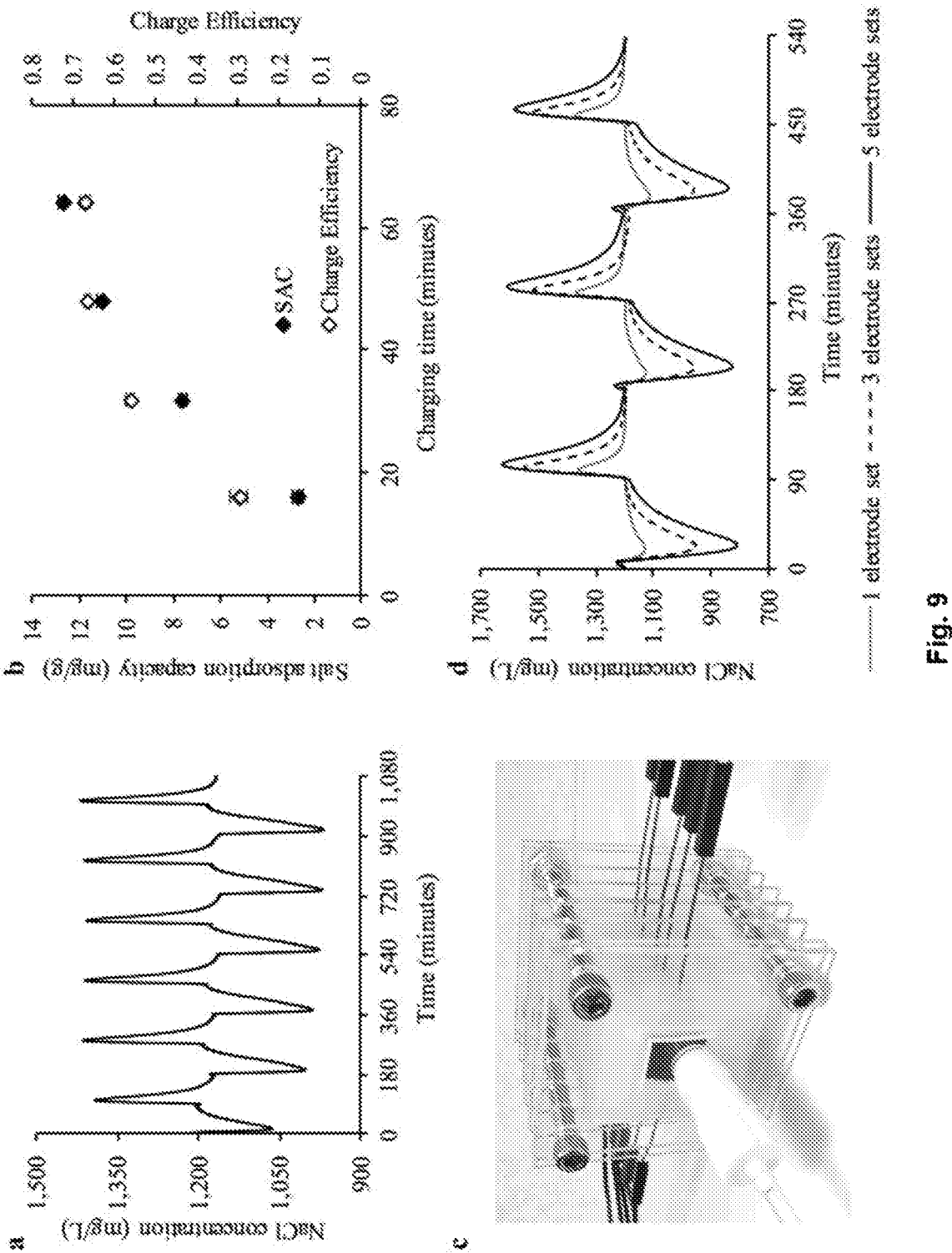
FIG. 9. Desalination performance of freestanding bread electrodes in a FT-CDI system. (a) Adsorption-desorption curve for single pair of bread electrodes operating in FT-CDI system. The sharp decrease in NaCl concentration relative to the stock solution of 1200 mg/L was ions being adsorbed to the electrodes from the feed stream when a potential of 1.2 V was applied. The increase in NaCl concentration relative to the stock concentration was ions being released back into solution when the voltage potential was removed. (b) Average salt adsorption capacity (SAC) and cumulative charge efficiency during the adsorption stage of cyclic CDI operation for a single pair of bread electrodes (mean+/−s.e.m., n=6 cycles). (c) Representative image of FT-CDI system housing 5 pairs of bread electrodes in series. (d) Adsorption-desorption curves for charging one, three, and five pairs of bread electrodes arranged in series with an applied potential of 1.2 V.

Next, we investigated the desalination performance of the bread electrodes in an FT-CDI system. A stock NaCl solution of 1200 $mg\ L^{-1}$ was continuously pumped through the FT-CDI cell while charge-discharge potentials of 1.2 V-0 V were applied to the bread electrodes. The salt concentration was monitored downstream of the FT-CDI cell using a flow-through conductivity meter. FIG. 9 (a) shows the change in salt concentration during cyclic CDI operation. The sharp decrease in salt concentration relative to the stock solution was due to ion adsorption to the carbonized bread when 1.2 V was applied to the electrode pair. As the electrode surface became saturated with ions, the concentration gradually increased back to the concentration of the stock solution. The adsorbed ions were then released back into the flowing stock solution when the potential was removed, which generated the brine stream portions shown in FIG. 9 (a) (that is, higher salt concentration relative to stock).

To compare the performance of the freestanding bread-derived electrodes with other CDI electrodes we examined a range of factors including salt adsorption capacity (SAC) and charge efficiency (A) during cyclic operation. The SAC is defined as the ratio of salt adsorbed from the feed stream to the mass of the electrode pair. Values for SAC typically range from 2 $mg\ g^{-1}$ to as high as 21 $mg\ g^{-1}$ for FT electrodes and naturally-based electrodes (Wood, A. R. et al., "Intact mangrove root electrodes for desalination" (2019) *RSC Advances* 9:4735-4743), although other studies have also reported lower values. The A is the ratio of salt adsorption to charge transferred and is indicative of energy consumption. Values for A typically range from 0.5-0.8 for CDI systems. Higher values closer to the theoretical maximum (unity) have been achieved with the use of ion specific membranes, but also result in higher overall material cost. FIG. 9 (b) shows the average SAC and A at representative time points during the adsorption phase from at least six continuous charge-discharge cycles. We observed an average SAC as high as 12.7 mg g$^{-1}$ at 1.2 V with a corresponding A of 0.67 (FIG. 9 (b)), which is competitive with commonly reported values. Importantly, the bread-derived electrodes did not require the use of additional materials (i.e. binders, conductive additives, current collectors, etc.) which are usually necessary for CDI electrode fabrication.

We also investigated a method to increase the reduction in feed concentration while only processing the feed solution once, which is closely related to CDI applications. We hypothesized that closely arranging a number of pairs of electrodes in series would produce an additive desalination effect that would lead to higher reductions in feed concentration. We designed a compact FT-CDI cell which housed five sets of electrode pairs arranged in series (FIG. 9 (c)). A charge-discharge potential of 1.2 V-0 V was applied to either 1, 3, or 5 sets of electrode pairs while a 1200 mg L$^{-1}$ NaCl solution was continuously passed through the cell. Simultaneously charging more electrode pairs in series led to larger reductions in feed concentration (FIG. 9 (d)).

Sustainable water desalination in decentralized locations. The ability to use bread as an effective FT-CDI electrode demonstrated the potential to utilize renewable waste materials for water desalination. High-cost laboratory equipment used in electrode fabrication and CDI operation can, unfortunately, limit applicability. This led us to develop an alternative fabrication process that could be coupled with solar energy to generate a sustainable desalination system. Briefly, Fabrication of freestanding bread-derived electrodes with firewood-based approach for solar-powered desalination system realizable in decentralized locations. Conductive electrodes were fabricated by heating bread in a fire and limiting the amount of oxygen present around the material. The freestanding bread electrodes were then connected to an inexpensive solar cell to power desalination.

Drawing inspiration from the thousands of years old process of making charcoal, we hypothesized that we could use a firewood-based approach to fabricate freestanding bread-derived electrodes. In our initial efforts, we positioned bread samples in the middle of a relatively high-temperature fire to achieve carbonization. Ideally, oxygen surrounding the bread samples would be consumed in the combustion process of wood, which would create an oxygen depletion zone around the bread samples and induce thermal decomposition of the material instead of burning. We were able to successfully produce bread-derived electrodes with low electrical resistance (R~10 Ohms) using this firewood-based technique. However, we were not able to retain the freestanding structure of bread to the degree we had previously achieved in the laboratory as the samples experienced warping and cracking.

The heating rate when carbonizing natural materials can affect the structural integrity of the final product; for example, if the heating rate is too fast, this can create a non-uniform temperature profile throughout the material, which can then generate internal stresses and induce cracking. We estimated that the heating rate used in our fire-based approach was at least 100 times faster than what was used in the lab, and therefore hypothesized that this was the cause of warpage/cracking. To reduce the heating rate, we controlled the intensity of the fire and the sample proximity to the fire to create a gradual, relatively low-temperature treatment. After approximately 1 hour, the bread samples remained intact and exhibited minimal signs of warpage and cracking. We had to solve a challenge as the samples exhibited extremely high electrical resistance (R>10$^7$ Ohms). Previous work has shown that the electrical resistance of natural-based materials can decrease by more than 10 orders of magnitude between the carbonization temperatures of 600° C. and 800° C. We therefore continued to increase the intensity of the fire to that of our original high-temperature treatment. After 1 hour of relatively high-temperature treatment, the samples exhibited minimal warpage/cracking and had an electrical resistance on the same order of magnitude as the samples fabricated in the controlled laboratory furnace (R~10 Ohms).

Similar to our previous results in the lab, the native fire-based electrodes exhibited a very low specific surface area (less than 1 m$^2$ g$^{-1}$). To chemically activate the electrodes, we soaked them in KOH, which can be obtained from wood ashes in a direct approach, for 2 hours and exposed them to another relatively high temperature fire treatment for 1 hour. Following this treatment, the electrodes exhibited a specific surface area as high as 800 m$^2$ g$^{-1}$. We used Raman spectroscopy to investigate if the molecular structure of the firewood-based electrodes differed from the laboratory-based electrodes. Both electrodes exhibited peaks in the Raman spectra at ~1352 cm$^{-1}$ and ~1598 cm$^{-1}$ which correspond to the defect (D) and graphitic (G) bands of carbon, respectively. Interestingly, the ratio of disordered-to-graphitic carbon ($I_D/I_G$) in the electrodes differed only slightly between carbonization methods. The $I_D/I_G$ values for the firewood-based and laboratory-based electrodes were 1.07 and 1.08, respectively, and very similar in magnitude to other studies using naturally-derived materials.

Figure 10:
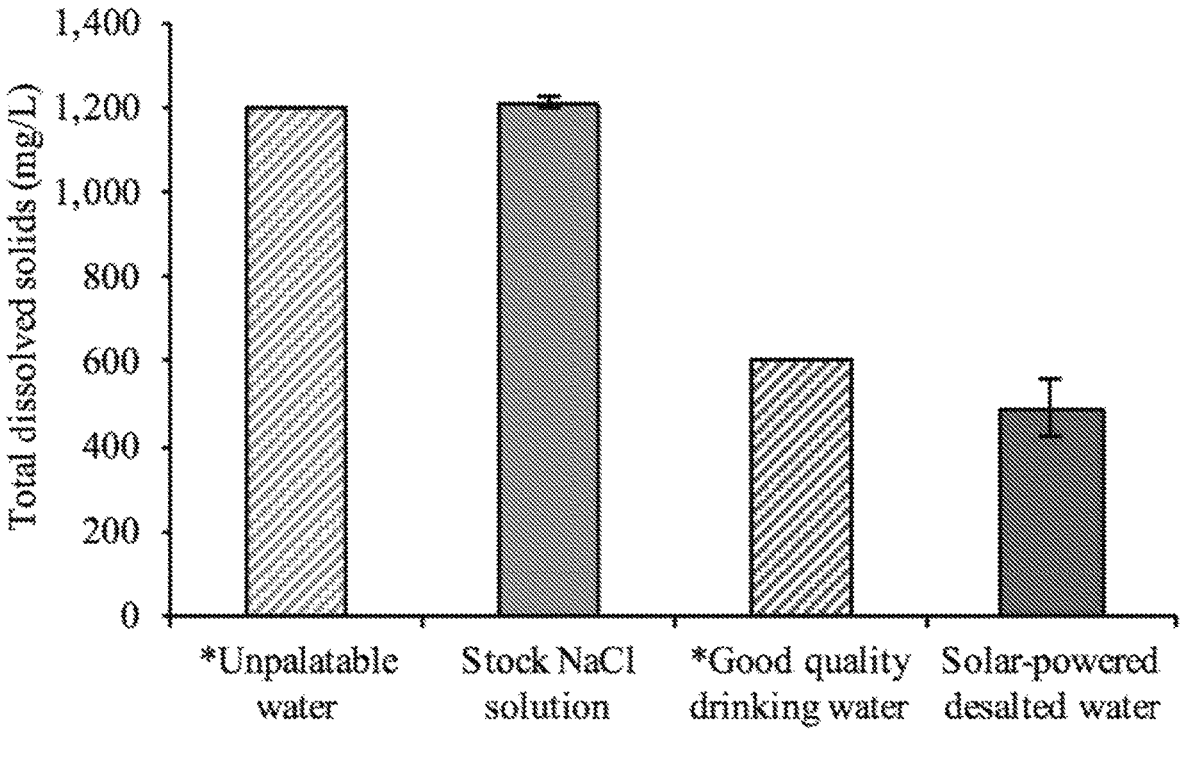
FIG. 10. Desalination performance of decentralized bread-derived CDI system fabricated using firewood-based approach. The freestanding bread electrodes were placed in an unpalatable salty solution (1200 mg/L NaCl) and attached to a solar cell (rated at 1.5 V). After 2.5 hours of solar-powered CDI the total dissolved solids was reduced from an unpalatable solution to good-quality drinking water according to the World Health Organization's standards (mean+/−s.e.m.).

To examine whether a sustainable waste-derived desalination system could come from used bread and a simple solar cell, we tested the desalination capabilities of the firewood-based bread-derived electrodes in a CDI system powered by solar energy. A pair of bread electrodes were placed in a reservoir of unpalatable salty water (1200 mg L$^{-1}$) and connected to a 1.5 V solar cell exposed to outside light. After charging for 2.5 hours, over half of the total reservoir volume (56% on average) was recovered and tested to determine water salinity. The average recovered salt concentration was 490 mg L$^{-1}$ (FIG. 10), which is well below the concentration of total dissolved solids (TDS) the World Health Organization recommends for good-quality drinking water. Importantly, a brine solution was generated in each trial after disconnecting the electrode pair from the solar cell. This indicated that the adsorbed salt ions were being released from the electrode surface and that the electrodes could be reused for desalination.

In conclusion, we created an approach to desalinate water using naturally-derived waste material (bread) through controlled carbonization. The carbonized structures had an advantageous pore structure and produced highly permeable, freestanding FT-CDI electrodes. We observed an average salt adsorption capacity of 12.7 mg g$^{-1}$ during cyclic operation at 1.2 V and a corresponding charge efficiency of 0.67. The measured hydraulic permeability of the bread-derived electrodes ($2.32\times10^{-11}$ m$^2$) was one of the highest reported values to date and presented the opportunity for multiple electrode pairs to be arranged in series without dramatically raising the resistance to water flow. Compact serial arrangement of multiple electrode pairs in a FT-CDI system enabled larger reductions in salt concentration during continuous flow operation.

We then used these scientific findings to create a new technique for electrode fabrication that does not require the use of common laboratory equipment and can be globally deployable even to developing countries with low-financial resources. Using a firewood-based approach, we fabricated CDI electrodes from bread and specifically demonstrated a gradual heating technique to maintain the structural integrity of the freestanding electrodes. We then coupled the firewood-based electrodes to a low-cost solar cell and produced good-quality drinking water (TDS<500 mg L$^{-1}$) from unpalatable salty water (TDS~1200 mg L$^{-1}$). These findings will have impacts ranging from the development of low-cost hierarchical-structured electrodes using naturally-derived renewable materials to desalination in developing and decentralized regions of the world.

Example 3—Pathogen Removal

We further expanded the scope of our water purification techniques to address pathogenic organisms in water. Unfortunately, waterborne diseases are one of the leading causes of death in many developing regions and the development of low-cost disinfection methods that feasible in such regions is highly important. Using our waste-derived electrodes we investigated the potential to also remove bacteria from contaminated water. In a similar experimental setup to our desalination experiments we were able to remove more than 99.5% of bacteria from water at low voltage potentials (i.e.–2 or 3 V). As a result of this work, we have also developed a nano/micro-scale surface decoration technique using bacteria.

The development of modern-day water treatment systems is one of the greatest engineering feats of our time and a primary contributor to urbanization in developed countries. Common water disinfection methods (i.e.—chlorine, UV, ozone) are highly effective for inactivating and killing bacterial, viral, and parasitic organisms but are often limited to developed regions with sufficient resources. Unfortunately, waterborne diseases persist in developing countries and are one of the leading causes of death. For example, diarrhea accounts for approximately 2.2 million deaths per year with 500,000 to 800,000 cases being children under the age of 5. To address this global challenge many research studies have investigated low-cost disinfection methods that are realizable in developing countries. One example is solar water disinfection (SODIS), which utilizes UV radiation from the sun to inactivate pathogenic organisms. Exposing contaminated water to direct sunlight for several hours can result in safe drinking water; however, the duration and efficacy of the approach are highly dependent on water clarity. Also, harmful ionic species (i.e.—dissolved salts, lead, fluoride, arsenic) are not removed in the process.

Continuing research to develop low-cost methods to simultaneously remove pathogenic organisms and harmful ionic species from water has led to the use of electrokinetic technologies, such as capacitive deionization (CDI). CDI technologies are most commonly used to desalinate brackish water through electrostatic adsorption of ionic species to a pair of charged electrodes. Common pathogenic bacteria (i.e. ~E. coli) possess a net negative surface charge due to ionized phosphoryl and carboxylate on the cell surface. Similar to chloride ions, bacteria experience an electrostatic force from the electric field in a CDI system that causes them to move towards the positive electrode. For example, commercially available activated carbon (AC) cloth may be used to simultaneously desalinate well water and reduce the viable bacteria cell count by almost 70% (Laxman, K. et al., "Desalination and disinfection of inland brackish ground water in a capacitive deionization cell using nanoporous activated carbon cloth electrodes" (2015) *Desalination* 362: 126-132). To enhance the disinfection capabilities of AC electrodes researchers have used surface functionalization with quaternary ammonium compounds or graphene oxide-graft-quaternized chitosan (Wang, J. et al., "Quaternary Ammonium Compound Functionalized Activated Carbon Electrode for Capacitive Deionization Disinfection" (2018) *ACS Sustain. Chem. Eng.* 6:17204-17210, Wang, Y. et al., "High-Performance Capacitive Deionization Disinfection of Water with Graphene Oxide-graft-Quaternized Chitosan Nanohybrid Electrode Coating" (2015) *ACS Nano* 9:10142-10157). Although these results are exciting, deploying and/or fabricating such specialized materials in developing countries may not be feasible.

The use of commonly wasted materials coupled with point-of-use fabrication techniques could provide tremendous potential for water disinfection in developing regions. As shown in Example 2, we recently developed a method to fabricate CDI electrodes from food waste (bread) using a conventional laboratory technique and a decentralized firewood-based technique. Using our firewood-based bread electrodes we were able to produce good quality drinking water from unpalatable salty water. More recently we have begun to explore the use of our bread-derived electrodes for water disinfection in a CDI system (FIG. 11 (a)). As a result of our preliminary work we have also discovered a technique to add nano/micro-scale surface decoration to our bread electrodes using bacteria.

Materials and Methods

Antibacterial experiments. *E. coli* (ATCC 8739) were grown overnight in LB broth and shaken at approximately 180 rpm at 37° C. Then, 1 mL of overnight culture was centrifuged at 3,000 rpm for 3 minutes to form a cell pellet and then re-suspended in filtered deionized water. The bacteria solution was diluted to a final concentration of approximately 104 CFU/mL and then 2 mL was added to the acrylic-Ecoflex housing which contained the bread-derived electrodes. A potential ranging from 0-3 V was applied to the electrode pairs and samples (10-15 uL) were collected from the bacteria solution at desired intervals. The viable cell concentration was then determined by the plate colony counting method.

Post-disinfection imaging. Live/Dead staining of bacteria was conducted by placing the electrodes in a solution of LIVE/DEAD BacLight (Molecular Probes L7012) for 15 minutes immediately following disinfection experiments. Imaging was then immediately performed on an inverted fluorescence microscope at excitation wavelengths corresponding to SYTO 9 (live stain) and propidium iodide (dead stain). Bright field imaging of the electrode surface was performed using contrast enhancement technique. Scanning electron microscopy (SEM) was performed on an FEI Quanta 600 FEG SEM. Samples were dehydrated in a vacuum chamber for 1 hour after disinfection experiments and then immediately imaged. The electrode surfaces were not coated with Au or Pt. Preparation for SEM imaging of surface decoration was performed as mentioned above.

Re-carbonization of electrodes with added nano-micro-scale decoration. Immediately following surface decoration experiments the electrodes were dehydrated in a vacuum chamber for 1 hour. Re-carbonization was accomplished through heating the samples to 800° C. for 1 hour under 95-100 cm³ min⁻¹ nitrogen flow at a heating rate of 5° C. min⁻¹ in a Lindberg 54553-VH tube furnace. The samples were then rinsed 3× with deionized water and dried in a vacuum chamber for 1 hour.

Results

Water disinfection using bread-based CDI system. Our first objective was to explore the disinfection capabilities of our bread electrodes in a CDI system at low-voltages. The bread electrodes were placed in an acrylic-Ecoflex housing and a solution of *Escherichia coli*(*E. coli*) at approximately 104 CFU mL⁻¹ in filtered deionized water was added to the device. A potential ranging from 0-3 V was applied to the electrode pairs and bacteria concentration over time was determined by the plate colony counting method. FIG. 11 (*b*) displays a representative experiment of cell concentration at varying potentials over the course of 4 hours. A decrease of approximately 20% in concentration was observed when no electrodes were placed in the acrylic-Ecoflex housing (control). We hypothesized a portion of the cells would die due to unfavorable growth conditions (that is, lack of nutrients and osmotic stress induced by filtered deionized water). Cell concentration decreased by approximately 60% when no potential and 1 V was applied to the electrode pair. Interestingly, when 2 V or 3 V was applied to the bread electrodes bacteria cell concentration was reduced by more than 99.5% (250-fold) over the course of 4 hours. These results demonstrated the potential applicability of food-waste derived electrodes for water disinfection in a CDI system.

Figure 12:
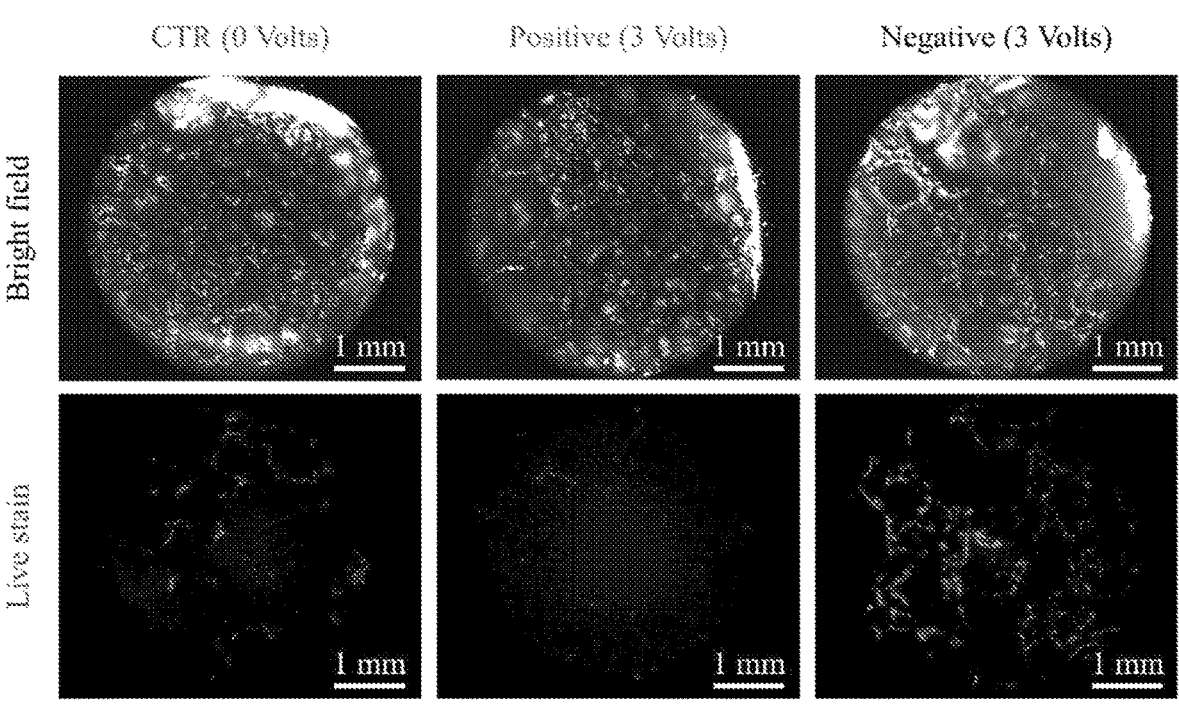
FIG. 12. Representative bright field images and fluorescent images of electrode surfaces and stained bacteria, respectively, after disinfection experiments. Grey signal on negative electrode indicated a large accumulation of cells or cell debris on the surface (magnification=5×).
Figure 13:
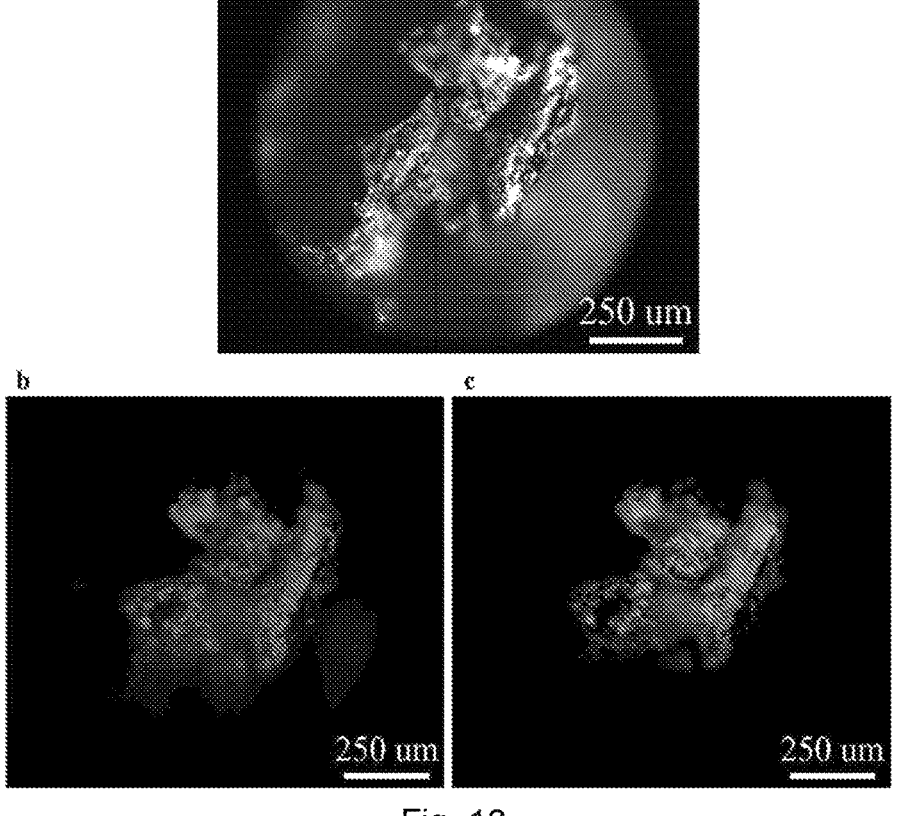
FIG. 13. Higher magnification images of negative electrode surface after disinfection experiments. (a) Bright field image of electrode surface which corresponds to fluorescent images. (b) Fluorescent image of bacteria components labeled with dead stain. (c) Fluorescent image of bacteria components labeled with live stain. (magnification=20×).

Imaging of bacteria on bread-electrodes after disinfection and in real time. Our preliminary disinfection experiments confirmed that we were largely reducing the number of viable bacteria cells in solution at potentials of 2 and 3 V. However, it was not clear whether bacteria were only being adsorbed to the electrode surfaces due to electrostatic force or if they were being adsorbed and killed. To investigate this issue, we used a Live/Dead stain to image bacteria cells on the surface of the electrodes after disinfection experiments. The live stain (SYTO 9) labels the membrane of bacteria cells regardless if they are damaged or not. The dead stain (propidium iodide), however, can only label nucleic acids inside the cell when the membrane is damaged, which then results in a reduction in SYTO 9 stain fluorescence. FIG. 12 displays live stain fluorescence from bacteria on the electrode surfaces after disinfection. There is a noticeable accumulation of bacteria on the electrode surface when no voltage is applied (control). There is a large accumulation of bacteria on the negative electrode and virtually no bacteria on the positive electrode. Dead stain was also used in this experiment, however, fluorescent signal strength to background noise posed an issue for producing quality images at low magnification. Higher resolution imaging revealed the accumulation of both live and dead bacteria on the negative electrode surface (FIG. 13 (*a-c*)).

Figure 14:
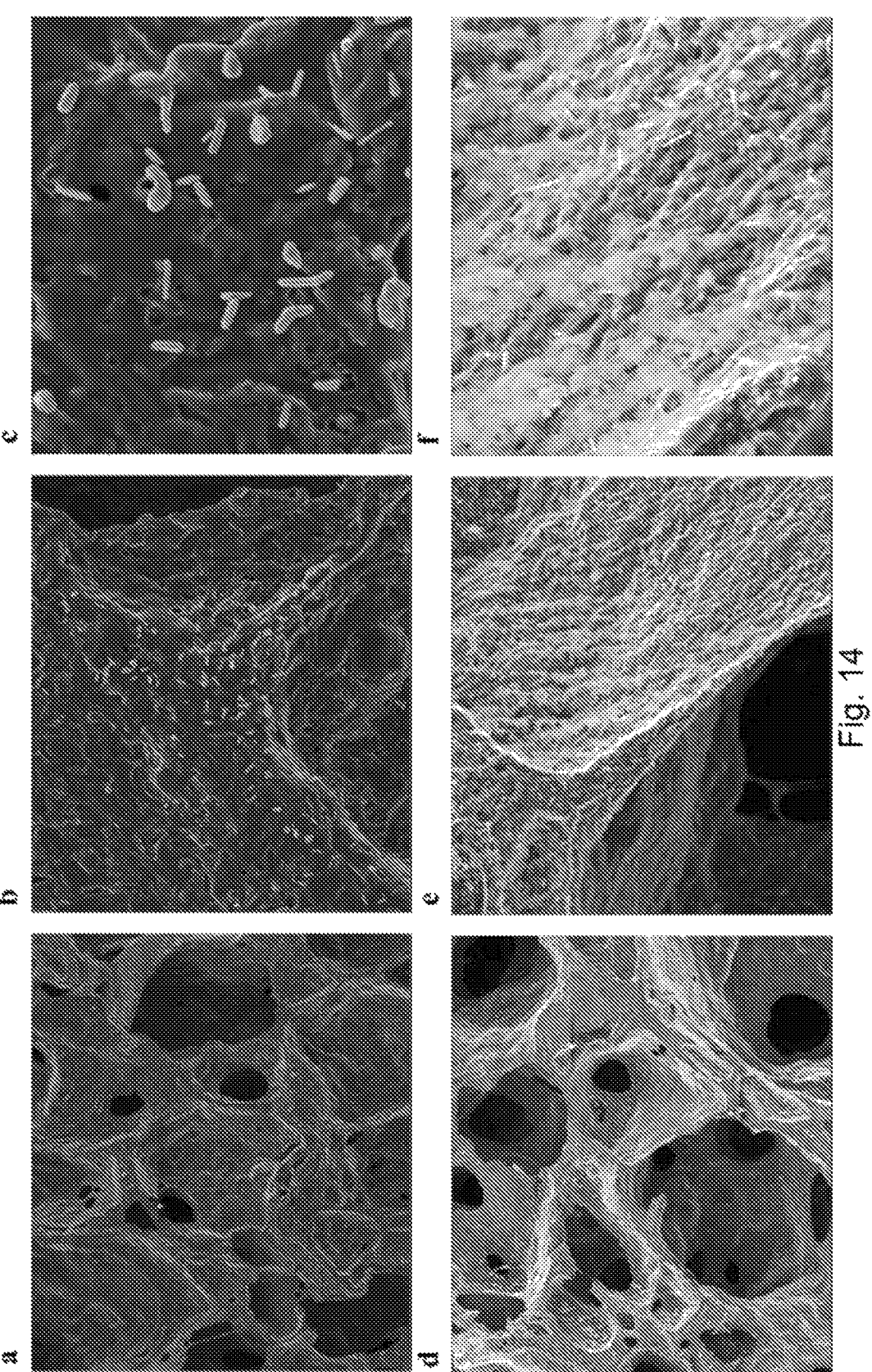
FIG. 14. (a-c) Representative SEM images of positive electrode surface after disinfection experiments at varying

Our initial hypothesis was that *E. coli* would move towards the positive electrode under the influence of an electric field. However, our Live/Dead staining results indicated the presence of both live and dead cells on the negative electrode surface after disinfection experiments. To further investigate these counter-intuitive results we used scanning electron microscopy to examine cell morphology on the electrode surfaces after disinfection experiments. We found sparsely placed *E. coli* on the positive electrode that appeared to remain intact (FIG. 14 (*a-c*)). The electrode surface with no applied voltage also contained sparsely placed *E. coli* that appeared to remain intact. On the negative electrode we found a large accumulation of what appeared to be cell debris (FIG. 14 (*d-e*)). We used energy-dispersive x-ray spectroscopy (EDS) to investigate the elemental composition of the debris on the negative electrode surface. We found significant traces of C, K, O, Na, Mg, P, Cl, and Ca. These elements are all found in *E. coli* and indicated that the accumulated debris was from bacteria. Our results from Live/Dead staining and SEM both indicated the accumulation of cellular components on the negative electrode following disinfection experiments. Although counter-intuitive, these results remained consistent through multiple replicate experiments.

We next developed a platform to image the movement of bacteria in our bread-based CDI system in real time. Our goal was to confirm our initial hypothesis that bacteria would move toward the positive electrode under the influence of an electric field. We used a custom designed system which housed the bread electrodes and bacteria solution while also allowing for real-time fluorescent microscopy (FIG. 15 (a,b)). The bottom of the device contained a thin glass coverslip which enabled us to observe bacteria between and at the electrode surfaces during disinfection experiments. We used a transformed bacteria strain of *E. coli* which were induced to express green fluorescent protein (GFP) to image cell movement in real time. In accordance with our hypothesis, the bacteria moved and adsorbed to the positive electrode when a voltage potential was applied to the electrode pair. FIG. 15 (*c*) displays the accumulation of GFP expressing bacteria on the positive electrode when a potential is initially applied. However, imaging of longer time points shows a reduction in fluorescent signal strength at longer time points. This could be due to cell lysis and the release of localized GFP in the bacteria cell into solution or photobleaching.

Nano/micro-scale electrode surface decoration using bacteria. Our disinfection experiments repeatedly produced an accumulation of what appeared to be bacteria cell debris on the negative electrode surface. We were fascinated by the nano/micro-structures produced in this process and hypothesize that these structures could potentially be used to add additional functionality to the electrodes when re-carbonized (FIG. 16 (*a*)). For example, we hypothesize that the decorated surface (FIG. 16 (*b*)) could lead to higher over surface area in comparison to the native bread electrodes (FIG. 16 (*c*)), which could potentially lead to CDI electrodes with higher salt adsorption capacity. Furthermore, the jagged architecture of the surface decoration and size scale (100s of nanometers) could enable enhanced disinfection capabilities through physical disruption of the bacteria membrane.

Nano/micro-scale decoration depends on duration of voltage, applied voltage potential, and solution. To further understand the nature by which bacteria surface decoration formed on the negative electrode we varied the duration, applied voltage to the electrode pairs, and the solution containing bacteria. FIG. 17 displays representative images of surface decoration on the negative electrode at varying time points (ΔV=3 V). Similar to previous results, the surface of the control sample remained unchanged and exhibited no added nanoscale complexity (FIG. 17 (*a*)). After 0.25 hours there in no noticeable change in the electrode surface (FIG. 17 (*b*)). After applying a potential of 3 V for 1 hour there is added nano/micro-scale structures (FIG. 17 (*c*)). It is important to note that there were variations in the uniformity of surface decoration which could be due to the highly porous architecture of the bread electrodes. Interestingly, after applying a potential of 3 V for 3 hours the surface decoration started to condense to form aggregates (FIG. 17 (*d*)). From these results, we concluded that approximately 1 hour of applied potential at 3 V was optimal for adding surface decoration to the negative electrode. It is important to note that these experimental conditions are likely to be specific to our setup (e.g., —size of electrodes, space between electrodes, conductivity of electrodes) but could potentially be broadened to other systems.

We also investigated the effect of varying voltage and the solution containing the bacteria. At lower voltages (1.2 V) we did not see added surface decoration to the negative electrode, whereas at higher voltages (3V) we consistently observed added surface decoration. Interestingly, in our previous work we observed a large difference in disinfection capabilities between 1 V and 3 V (FIG. 11 (*b*)). We hypothesized that cell lysis at higher voltages could be playing a crucial role in adding surface decoration to the negative electrode. Changing the bacteria containing solution from filtered deionized water to LB broth inhibited surface decoration on the negative electrode (FIG. 18 (a,b)). We used LB broth because it is an ideal growth solution for *E. coli*, however, it also contains 5 g L$^{-1}$ NaCl. Sodium ions in LB broth could group around the negatively charged surface of bacteria and produce a charge screening effect, which reduces the electrostatic force on bacteria in the presence of an electric field. We hypothesize that additional ionic species from LB broth could change the dynamics of bacteria in our system, we could then effect surface decoration.

Nana/micro-scale decoration is retained after re-carbonization. We next investigated if the added surface decoration could be retained through re-carbonization. Our EDS results indicated that the surface decoration was a mixture of cellular debris which could be either organic or inorganic. Our initial hypothesis was that re-carbonization would allow us to retain the carbon framework of the surface decoration which would therefore enable higher surface area while also being electrically conductive. We found that the added surface decoration was retained after re-carbonizing the electrode and rinsing it with deionized water (FIG. 19 (a,b)). However, EDS analysis revealed that the surface decoration was not purely C, but rather a combination of O and Mg (FIG. 20 (a,b)).

Using MgCl$_2$ to generate bacteria surface decoration mimic. We hypothesized that Mg ions present in bacteria cells were being released during cell lysis from our disinfection experiments. Because Mg is a positively charged ion, it would then move towards the negative electrode under the influence of the electric field. To test this hypothesis, we used a solution of MgCl$_2$ in our disinfection device without the presence of bacteria and applied a potential of 3 V to the bread-derived electrode pair for 1 hour. The molar concentration of MgCl$_2$ used was approximately 100 pM, which corresponds to comparable Mg concentrations in bacteria disinfection experiments. SEM imaging revealed that almost identical nano/micro-scale surface decoration was generated using the MgCl$_2$ solution (FIG. 21).

We further reviewed the literature and found previous reports of generating magnesium hydroxide and magnesium oxide coatings on electrode surfaces through electrolytic processing (Hashaikeh, R. & Szpunar, J. A., "Electrolytic processing of MgO coatings" (2009) *J. Phys. Conf. Ser.* 165:012008, Dinamani, M. & Kamath, P. V., "Electrosynthesis of Mg(OH)2 Coatings on Stainless Steel Substrates" (2004) *J. Appl. Electrochem.* 34:899-902, Zou, G. et al., "Highly textural lamellar mesostructured magnesium hydroxide via a cathodic electrodeposition process" (2007) *Mater. Lett.* 61:1990-1993). In short, hydroxide ions produced from electrolysis at the negative electrode combine with magnesium ions to form magnesium hydroxide. Additional thermal treatment causes the dehydration of magnesium hydroxide to form magnesium oxide (Hashaikeh, R. & Szpunar, J. A., "Electrolytic processing of MgO coatings" (2009) *J. Phys. Conf. Ser.* 165:012008). Previous reports have produced similar mesostructured Mg(OH)$_2$ surface decoration using this method (Dinamani, M. & Kamath, P. V., "Electrosynthesis of Mg(OH)2 Coatings on Stainless Steel Substrates" (2004) *J. Appl. Electrochem.* 34:899-902, Zou, G. et al., "Highly textural lamellar mesostructured magnesium hydroxide via a cathodic electrodeposition process" (2007) *Mater. Lett.* 61:1990-1993). However, these reports used a molar concentration of Mg at least 240 million times that of which we used. Furthermore, to our knowledge no known studies have used bacteria to generate magnesium hydroxide or magnesium oxide surface coatings.

In this example, we demonstrated the feasibility of using waste-derived electrodes to reduce the bacteria concentration of contaminated water by more than 99.5% at low voltages (2 V or 3 V). We hypothesis that cell lysis is a primary contributor to disinfection, which was indicated by the accumulation of cell debris on the negative electrode surface following experiments. We also demonstrated a method of generating nano/micro-scale surface decoration comprised of magnesium, oxygen, and potentially hydrogen on the negative electrode. Although similar work has been conducted using magnesium compounds, there is no known work using bacteria to generate such structures. We hypothesize our method of bacteria-enabled surface decoration could be more applicable to developing countries since the process also includes bacteria disinfection.

The present invention has been described with reference to certain exemplary embodiments, dispersible compositions and uses thereof. However, it will be recognized by those of ordinary skill in the art that various substitutions, modifications or combinations of any of the exemplary embodiments may be made without departing from the spirit and scope of the invention.

What is claimed is:

1. A porous electrode comprising:
   an electrode body comprising an architecturally intact carbonized organic material having a hydraulic permeability of at least 0.5×10$^{-13}$ m$^2$, as determined by application of Darcy's Law, and optionally having hierarchical porosity, wherein the organic material is a porous plant portion, and wherein the porous plant portion is aerenchyma; and
   a non-metal conductor attached to the electrode body.

2. The electrode of claim 1, decorated with carbonized bacteria lysis residue.

3. The electrode of claim 1, wherein the aerenchyma is red mangrove aerenchyma.

4. The electrode of claim 1, wherein the architecturally intact carbonized organic material has a hydraulic permeability of at least 1.1×10$^{-11}$ m$^2$, as determined by application of Darcy's Law.

5. A desalination system comprising:
   a fluid conduit having an inlet and an outlet;
   a first pair of porous electrodes according to claim 1, separated by a gap, and disposed within the conduit so that water flowing through the conduit passes through the electrodes;
   an electrically-conductive lead attached independently to each of the non-metal conductors; and
   a DC power supply having a positive terminal attached to one electrically-conductive lead, and a negative terminal attached to the other electrically-conductive lead.

6. The desalination system of claim 5, further comprising a switch for controlling voltage from the power supply to the electrodes and a controller for controlling the switch, the controller comprising at least a processor and computer-readable instructions for the processor to control electrical current from the power supply to the electrodes.

7. The desalination system of claim 5, further comprising:

a switch for controlling voltage from the power supply to the electrodes;

a sensor at the outlet of the fluid conduit for measuring salinity of effluent from the outlet;

a waste outlet connected to the outlet of the fluid conduit;

a valve for directing water from the outlet of the fluid conduit to the waste outlet;

and a controller for controlling the switch, the controller comprising at least a processor and computer-readable instructions for the processor to control electrical current from the power supply to the electrodes and for the processor to turn off the power supply when salinity of the effluent approaches or equals that of water flowing into the inlet, and for controlling the valve to direct waste water through the waste outlet.

8. The desalination system of claim 5, wherein the DC power supply comprises a solar cell or a solar panel and/or a battery.

9. The desalination system of claim 5, comprising two or more pairs of the porous electrode in one or more conduits and in series with and/or in parallel to the first porous electrode pair.

10. The desalination system of claim 5, further comprising a recirculation subsystem configured to return effluent from the outlet of the conduit to the inlet of the conduit.

11. A method of making an electrode for use in a capacitive deionization desalination system, comprising:

carbonizing an architecturally intact porous organic material to produce an intact carbonized structure having a hydraulic permeability of at least $0.5 \times 10^{-13}$ m$^2$, as determined by application of Darcy's Law, wherein the porous organic material is a porous plant portion, and wherein the porous plant portion is aerenchyma; and attaching a conductor to the carbonized material to produce an electrode.

12. The method of claim 11, wherein the intact organic material is carbonized at a carbonization temperature of at least 550° C.

13. The method of claim 11, wherein the temperature is raised from 100° C. to the carbonization temperature over a time period of at least 30 minutes and/or with a temperature ramp rate of no more than 20° C. per minute.

14. The method of claim 11, further comprising etching the carbonized structure to produce a hierarchical porosity.

15. The method of claim 11, further comprising decorating the architecturally intact carbonized structure of the electrode with carbonized bacteria lysis residue by placing the electrode with a counter-electrode in a solution comprising bacteria in water; applying a voltage of at least 1V, with the electrode having a negative charge, to lyse the bacteria and draw cell debris to the electrode, and carbonizing the electrode with the cell debris, thereby decorating the electrode with carbonized cell debris.

16. A method of purifying salt or brackish water, comprising:

flowing water through the conduit of the desalination system of claim 5;

applying a voltage to the electrode pair effective to deionize the water;

collecting the deionized water as an effluent from the outlet of the conduit.

17. The method of claim 16, further comprising passing the effluent from the outlet of the conduit though the conduit and collecting the effluent one or more additional times.

18. The method of claim 16, further comprising, after collecting deionized water from the outlet of the conduit, discontinuing application of the voltage to the electrodes; washing the electrodes with water; and collecting brine from the outlet of the conduit.

19. The method of claim 16, comprising passing the collected deionized water as the effluent from the outlet of the conduit through the conduit while applying a voltage effective to disinfect the water and collecting the disinfected, deionized water from the outlet of the conduit.

* * * * *